United States Patent
Wang et al.

(10) Patent No.: US 10,853,747 B2
(45) Date of Patent: Dec. 1, 2020

(54) SELECTION OF COMPUTATIONAL AGENT FOR TASK PERFORMANCE

(71) Applicant: Google LLC, Mountain View, CA (US)

(72) Inventors: Bo Wang, San Jose, CA (US); Lei Zhong, Mountain View, CA (US); Barnaby John James, Los Gatos, CA (US); Saisuresh Krishnakumaran, Mountain View, CA (US); Robert Stets, Mountain View, CA (US); Bogdan Caprita, Mountain View, CA (US); Valerie Nygaard, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 463 days.

(21) Appl. No.: 15/815,353

(22) Filed: Nov. 16, 2017

(65) Prior Publication Data

US 2018/0096283 A1 Apr. 5, 2018

Related U.S. Application Data

(63) Continuation of application No. PCT/US2017/054456, filed on Sep. 29, 2017.
(Continued)

(51) Int. Cl.
*G10L 15/22* (2006.01)
*G06Q 10/06* (2012.01)
(Continued)

(52) U.S. Cl.
CPC ...... *G06Q 10/063112* (2013.01); *G10L 15/08* (2013.01); *G10L 15/22* (2013.01);
(Continued)

(58) Field of Classification Search
USPC .................................. 704/231–257, 270–275
See application file for complete search history.

(56) References Cited

U.S. PATENT DOCUMENTS

| 7,036,128 | B1 | 4/2006 | Julia et al. |
| 7,398,209 | B2 * | 7/2008 | Kennewick ............. G10L 15/22 704/255 |

(Continued)

FOREIGN PATENT DOCUMENTS

| CN | 104335234 | 2/2015 |
| JP | H10222187 | 8/1998 |

(Continued)

OTHER PUBLICATIONS

Amazon, "Alexa Skills," retrieved from: https://www.amazon.com/alexa-skills/b/ref=topnav_storetab_a2s?ie=UTF8&node=13727921011, Jan. 26, 2017, 3 pp.

(Continued)

*Primary Examiner* — Jesse S Pullias
(74) *Attorney, Agent, or Firm* — Middleton Reutlinger

(57) ABSTRACT

An example method includes receiving, by a computational assistant executing at one or more processors, a representation of an utterance spoken at a computing device; identifying, based on the utterance, a task to be performed; determining a capability level of a first party (1P) agent to perform the task; determining capability levels of respective third party (3P) agents of a plurality of 3P agents to perform the task; responsive to determining that the capability level of the 1P agent does not satisfy a threshold capability level, that a capability level of a particular 3P agent of the plurality of 3P agents is a greatest of the determined capability levels, and that the capability level of the particular 3P agent satisfies the threshold capability level, selecting the particu-
(Continued)

lar 3P agent to perform the task; and performing one or more actions determined by the selected agent to perform the task.

11 Claims, 10 Drawing Sheets

Related U.S. Application Data

(60) Provisional application No. 62/403,665, filed on Oct. 3, 2016.

(51) Int. Cl.
*G10L 15/08* (2006.01)
*G06F 16/951* (2019.01)
*G10L 13/00* (2006.01)

(52) U.S. Cl.
CPC ............ *G06F 16/951* (2019.01); *G10L 13/00* (2013.01); *G10L 2015/088* (2013.01); *G10L 2015/223* (2013.01)

(56) References Cited

U.S. PATENT DOCUMENTS

| | | | |
|---|---|---|---|
| 7,640,160 B2* | 12/2009 | Di Cristo | G10L 15/22 704/257 |
| 9,275,641 B1 | 3/2016 | Gelfenbeyn et al. | |
| 9,848,082 B1* | 12/2017 | Lillard | H04M 3/5231 |
| 9,922,642 B2 | 3/2018 | Pitschel et al. | |
| 9,953,088 B2 | 4/2018 | Gruber et al. | |
| 2004/0044516 A1 | 3/2004 | Kennewick et al. | |
| 2008/0228494 A1 | 9/2008 | Cross | |
| 2010/0076763 A1 | 3/2010 | Ouchi et al. | |
| 2012/0035935 A1 | 2/2012 | Park et al. | |
| 2013/0158994 A1 | 6/2013 | Jaramillo et al. | |
| 2013/0290002 A1 | 10/2013 | Togawa et al. | |
| 2013/0311997 A1 | 11/2013 | Gruber et al. | |
| 2013/0346068 A1 | 12/2013 | Solem et al. | |
| 2014/0164400 A1 | 6/2014 | Kruglick | |
| 2014/0173625 A1* | 6/2014 | Kumar | G06F 9/4843 718/106 |
| 2014/0207469 A1* | 7/2014 | Dykstra-Erickson | G06F 1/3287 704/275 |
| 2015/0162000 A1 | 6/2015 | Di Censo et al. | |
| 2016/0035353 A1 | 2/2016 | Chen et al. | |
| 2016/0189717 A1* | 6/2016 | Kannan | G10L 15/26 704/275 |
| 2016/0210363 A1 | 7/2016 | Rambhia et al. | |
| 2016/0225370 A1 | 8/2016 | Kannan et al. | |
| 2016/0335138 A1 | 11/2016 | Surti et al. | |

FOREIGN PATENT DOCUMENTS

| | | | |
|---|---|---|---|
| JP | 2005276213 | A | 10/2005 |
| JP | 2014503874 | A | 2/2014 |
| JP | 2015528140 | A | 9/2015 |
| KR | 20140059110 | | 5/2014 |
| WO | 2008012537 | A1 | 1/2008 |
| WO | 2013190963 | A1 | 5/2016 |
| WO | 2016085775 | | 6/2016 |

OTHER PUBLICATIONS

Api.ai, "Build Conversation Actions for Google Assistant Users," retrieved from: https://api.ai/blog/2016/12/08/build-conversation-actions-for-the-google-assistant/, Dec. 8, 2016, 2 pp.
Badcock, "First Alexa Third-Party Skills Now Available for Amazon Echo," Alexa Blogs, retrieved from: https://developer.amazon.com/blogs/post/TxC2VHKFEIZ9SG/First-Alexa-Third-Party-Skills-Now-Available-for-Amazon-Echo, Aug. 17, 2015, 5 pp.
Newman, "It's On! 2017 is the Year the Virtual Assistant Wars Get Real," retrieved from: https://www.fastcompany.com/3066831/its-on-2017-is-the-year-the-virtual-assistant-wars-get-real, Dec. 28, 2016, 9 pp.
O'Hear, "Api.ai. Makes It Easier to Add a Siri-Like Conversational UI to Your LoT App or Device," retrieved from: https://techcrunch.com/2015/05/18/api-ai/, May 18, 2015, 7 pp.
U.S. Appl. No. 15/365,135, by Ruijie He et al., filed Nov. 30, 2016.
U.S. Appl. No. 15/603,092, by Ibrahim Badr, filed May 23, 2017.
U.S. Appl. No. 15/815,368, by Robert Stets et al., filed Nov. 16, 2017.
U.S. Appl. No. 15/815,375, by Valerie Nygaard et al., filed Nov. 16, 2017.
Amazon, "Choosing the Invocation Name for a Custom Skill," retrieved from https://developer.amazon.com/docs/custom-skills/choose-the-invocation-name-for-a-custom-skill.html, Apr. 18, 2017, 4 pp.
U.S. Appl. No. 62/403,665, by Bo Wang et al., filed Oct. 3, 2016.
European Patent Office; International Search Report and Written Opinion of Ser. No. PCT/US2017/054456; 13 pages; dated Dec. 22, 2017.
Japanese Patent Office; Notice of Termination of Reconsideration issue in Application No. 2019-517918; 6 pages; dated Aug. 24, 2020.
European Patent Office; Communication Pursuant to Article 94(3) EPC issued in Application No. 17784147.5; 10 pages; dated Aug. 18, 2020.

* cited by examiner

SELECTION OF COMPUTATIONAL AGENT FOR TASK PERFORMANCE

RELATED APPLICATION

This application is a continuation of PCT Application No. PCT/US2017/054456, filed Sep. 29, 2017 which claims the benefit of U.S. Provisional Patent Application No. 62/403,665, filed Oct. 3, 2016, the entire contents of which are hereby incorporated by reference.

BACKGROUND

Some computing platforms may provide a user interface from which a user can chat, speak, or otherwise communicate with a virtual, computational assistant (e.g., also referred to as "an intelligent personal assistant" or simply as an "assistant") to cause the assistant to output useful information, respond to a user's needs, or otherwise perform certain operations to help the user complete a variety of real-world or virtual tasks. For instance, a computing device may receive, with a microphone, voice input (e.g., audio data) that corresponds to a user utterance. An assistant executing at least in part at the computing device may analyze the voice input and attempt to satisfy the utterance by outputting useful information based on the utterance, responding to a user's needs indicated by the utterance, or otherwise perform certain operations to help the user complete a variety of real-world or virtual tasks based on the utterance.

SUMMARY

In general, techniques of this disclosure may enable users to communicate with multiple virtual, computational agents/assistants. For instance, there may be several agents available to a user via a computing device that may be at least somewhat capable of responding to an utterance (e.g., request, question, query, order, etc.).

In accordance with one or more techniques of this disclosure, and as opposed to multiple agents simultaneously processing a received utterance, a computational assistant may initially process the utterance and select an appropriate agent to respond to the utterance. That is, the most appropriate agent may be selected for any given task received in an utterance. This provides an adaptive interface which improves user-machine interaction. Having a single assistant initially process the utterance before an appropriate agent responds to the utterance prevents other (less appropriate) agents from wasting computing resources or consuming power, processing the utterance. Accordingly, the techniques of this disclosure may enable a system to use less power and system resources than other systems that enable multiple agents to simultaneously process received utterances.

In one example, a method includes receiving, by a computational assistant executing at one or more processors, a representation of an utterance spoken at a computing device; identifying, based on the utterance, a task to be performed; determining a capability level of a first party agent to perform the task; determining capability levels of respective third party agents of a plurality of third party agents to perform the task; responsive to determining that the capability level of the first party agent does not satisfy a threshold capability level, that a capability level of a particular third party agent of the plurality of third party agents is a greatest of the determined capability levels, and that the capability level of the particular third party agent satisfies the threshold capability level, selecting the particular third party agent to perform the task; and causing the selected agent to perform the task.

In another example, a system includes at least one processor; and at least one memory comprising instructions that when executed, cause the at least one processor to execute an assistant configured to: receive a representation of an utterance spoken at one or more microphones operably connected to the computing device; identify, based on the utterance, a task to be performed; determine a capability level of a first party agent to perform the task; determine capability levels of respective third party agents of a plurality of third party agents to perform the task; responsive to determining that the capability level of the first party agent does not satisfy a threshold capability level, that a capability level of a particular third party agent of the plurality of third party agents is a greatest of the determined capability levels, and that the capability level of the particular third party agent satisfies the threshold capability level, select the particular third party agent to perform the task; and cause the selected agent to perform the task.

In another example, a system includes means for receiving, by a computational assistant executing at one or more processors, a representation of an utterance spoken at a computing device; means for identifying, based on the utterance, a task to be performed; means for determining a capability level of a first party agent to perform the task; means for determining capability levels of respective third party agents of a plurality of third party agents to perform the task; means for selecting, responsive to determining that the capability level of the first party agent does not satisfy a threshold capability level, that a capability level of a particular third party agent of the plurality of third party agents is a greatest of the determined capability levels, and that the capability level of the particular third party agent satisfies the threshold capability level, the particular third party agent to perform the task; and means for causing the selected agent to perform the task.

In another example, a computer-readable storage medium stores instructions that, when executed, cause one or more processors of a computing system to, receive a representation of an utterance spoken at a computing device; identify, based on the utterance, a task to be performed; determine a capability level of a first party agent to perform the task; determine capability levels of respective third party agents of a plurality of third party agents to perform the task; responsive to determining that the capability level of the first party agent does not satisfy a threshold capability level, that a capability level of a particular third party agent of the plurality of third party agents is a greatest of the determined capability levels, and that the capability level of the particular third party agent satisfies the threshold capability level, select the particular third party agent to perform the task; and cause the selected agent to perform the task.

The details of one or more examples are set forth in the accompanying drawings and the description below. Other features, objects, and advantages of the disclosure will be apparent from the description and drawings, and from the claims.

DETAILED DESCRIPTION

Figure 1:
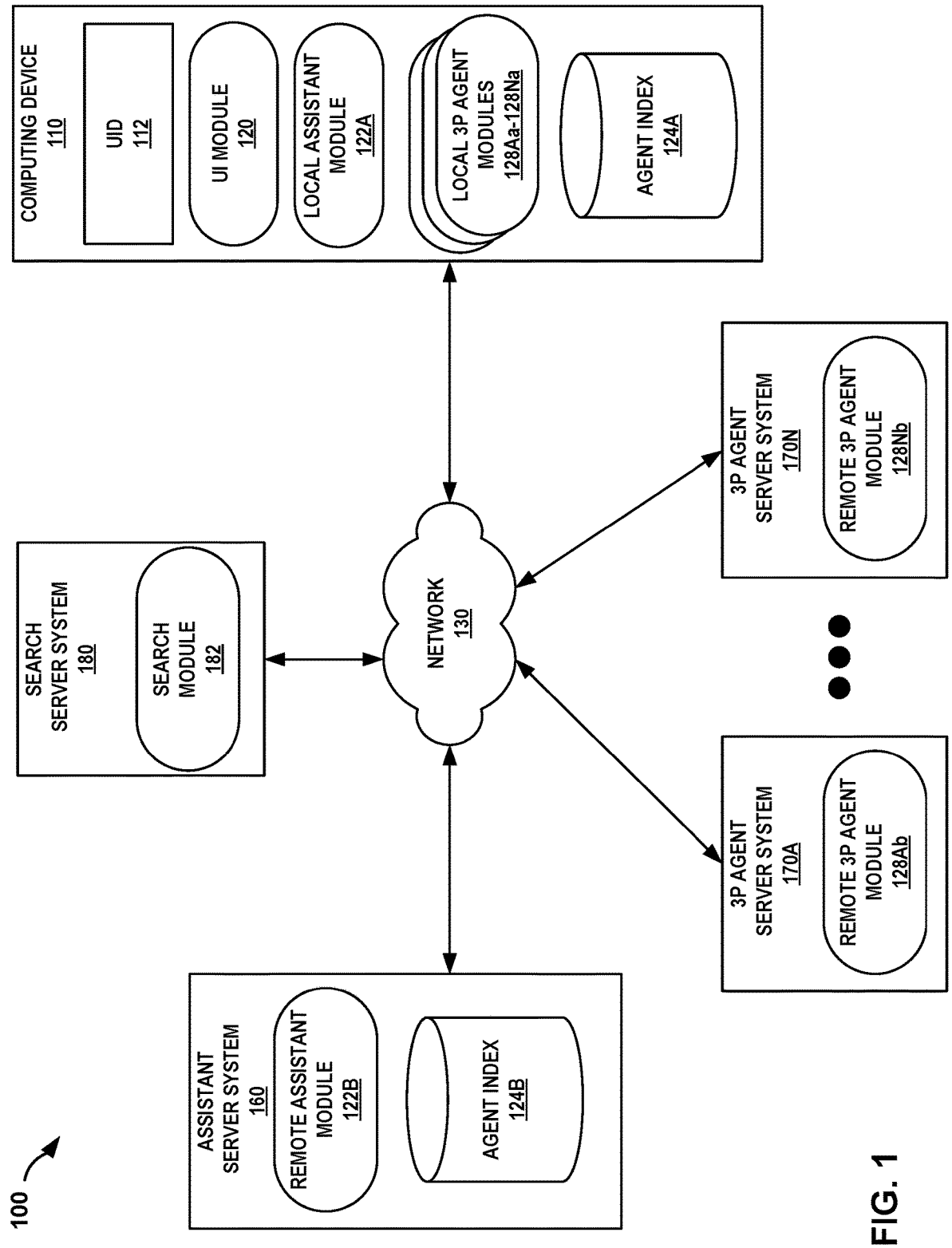
FIG. 1 is a conceptual diagram illustrating an example system that executes an example virtual assistant, in accordance with one or more aspects of the present disclosure.

In general, techniques of this disclosure may enable a virtual, computational assistant (e.g., also referred to as "an intelligent personal assistant" or simply as an "assistant") to manage multiple agents for responding to user input (e.g., for satisfying user utterances or textual input). For instance, a computing device may receive, with a microphone, voice input (e.g., audio data) that corresponds to a user utterance. An agent selection module may analyze the voice input, and select an agent from a plurality of agents to satisfy the utterance. The plurality of agents may include one or more first party (1P) agents and one or more third party (3P) agents. The 1P agents may be included within the assistant and/or share a common publisher with the assistant, agent selection module, and/or an operating system of the computing device that received the voice input.

To perform the selection, the agent selection module may determine whether to satisfy the utterance using a 1P agent, a 3P agent, or some combination of 1P agents and 3P agents. Where the agent selection module determines to satisfy the utterance at least in part using a 3P agent, the agent selection module may rank one or more 3P agents based on the utterance.

The selected language agent (a 1P language agent, a 3P language agent, or some combination of 1P language agents and 3P language agents) may attempt to satisfy the utterance. For instance, the selected agent may perform one or more actions (e.g., output information based on the utterance, respond to a user's needs indicated by the utterance, or otherwise perform certain operations to help the user complete a variety of real-world or virtual tasks based on the utterance) to satisfy the utterance.

In some examples, there may be an indication of the type of agent performing actions. For instance, where the one or more actions include "speaking" with the user, 1P agents and 3P agents may utilize different voices. As one example, 1P agents may all utilize a reserved voice of a plurality of voices and 3P agents may utilize other voices of the plurality of voices, but may be prohibited from using the reserved voice. Where the one or more actions include a textual interaction with the user, the agents may use different identifiers (e.g., "agent 1: I have made your dinner reservation" and "agent 2: I have moved $100 from your checking account to your savings account"), different fonts for each agent, and so on.

Throughout the disclosure, examples are described where a computing device and/or a computing system analyzes information (e.g., context, locations, communications, contacts, chat conversations, voice conversations, etc.) associated with a computing device and a user of a computing device, only if the computing device receives permission from the user of the computing device to analyze the information. For example, in situations discussed below, before an assistant executing at a computing device or computing system can collect or may make use of information associated with a user, the user may be provided with an opportunity to provide input to control whether the assistant (or other programs or features of the computing device and/or computing system) can collect and make use of user information or to dictate whether and/or how the computing devices and/or computing systems may receive content that may be relevant to the user. In addition, certain data may be encrypted and/or treated in one or more ways before it is stored or used by the assistant or underlying computing device and/or computing system, so that personally-identifiable information is removed. For example, a user's identity may be treated so that no personally identifiable information can be determined about the user, or a user's geographic location may be generalized where location information is obtained (such as to a city, ZIP code, or state as opposed to a coordinate location or physical address), so that a particular location of a user cannot be determined. Thus, the user may have control over how information is collected about the user and used by the assistant and the underlying computing device and computing system that executes the assistant.

FIG. 1 is a conceptual diagram illustrating an example system that executes an example virtual assistant, in accordance with one or more aspects of the present disclosure. System 100 of FIG. 1 includes assistant server system 160 in communication, via network 130, with search server system 180, third party (3P) agent server systems 170A-170N (collectively, "3P agent server systems 170"), and computing device 110. Although system 100 is shown as being distributed amongst assistant server system 160, 3P agent server systems 170, search server system 180, and computing device 110, in other examples, the features and techniques attributed to system 100 may be performed internally, by local components of computing device 110. Similarly, assistant server system 160 and/or 3P agent server systems 170 may include certain components and perform various techniques that are otherwise attributed in the below description to search server system 180 and/or computing device 110.

Network 130 represents any public or private communications network, for instance, cellular, Wi-Fi, and/or other types of networks, for transmitting data between computing systems, servers, and computing devices. Assistant server system 160 may exchange data, via network 130, with computing device 110 to provide a virtual assistance service that is accessible to computing device 110 when computing device 110 is connected to network 130. Similarly, 3P agent server systems 170 may exchange data, via network 130, with computing device 110 to provide virtual agents services that are accessible to computing device 110 when computing device 110 is connected to network 130. Assistant server system 160 may exchange data, via network 130, with search server system 180 to access a search service provided by search server system 180. Computing device 110 may exchange data, via network 130, with search server system 180 to access the search service provided by search server system 180. 3P agent server systems 170 may exchange data, via network 130, with search server system 180 to access the search service provided by search server system 180.

Network 130 may include one or more network hubs, network switches, network routers, or any other network equipment, that are operatively inter-coupled thereby providing for the exchange of information between server systems 160, 170, and 180 and computing device 110. Computing device 110, assistant server system 160, 3P agent server systems 170, and search server system 180 may transmit and receive data across network 130 using any suitable communication techniques. Computing device 110, assistant server system 160, 3P agent server systems 170, and search server system 180 may each be operatively coupled to network 130 using respective network links. The links coupling computing device 110, assistant server system 160, 3P agent server systems 170, and search server system 180 to network 130 may be Ethernet or other types of network connections and such connections may be wireless and/or wired connections.

Assistant server system 160, 3P agent server systems 170, and search server system 180 represent any suitable remote computing systems, such as one or more desktop computers, laptop computers, mainframes, servers, cloud computing systems, etc. capable of sending and receiving information both to and from a network, such as network 130. Assistant server system 160 hosts (or at least provides access to) a virtual assistant service. 3P agent server systems 170 host (or at least provide access to) virtual language agents. Search server system 180 hosts (or at least provides access to) a search service. In some examples, assistant server system 160, 3P agent server systems 170, and search server system 180 represent cloud computing systems that provide access to their respective services via the cloud.

Computing device 110 represents an individual mobile or non-mobile computing device. Examples of computing device 110 include a mobile phone, a tablet computer, a laptop computer, a desktop computer, countertop devices, a set-top box, a television, a wearable device (e.g., a computerized watch, computerized eyewear, computerized gloves, etc.), a home automation device or system (e.g., an intelligent thermostat or home assistant device), a personal digital assistants (PDA), a gaming system, a media player, an e-book reader, a mobile television platform, an automobile navigation or infotainment system, or any other type of mobile, non-mobile, wearable, and non-wearable computing device configured to execute or access a virtual assistant and receive information via a network, such as network 130.

Computing device 110 includes user interface device (UID) 112, user interface (UI) module 120, and local assistant module 122A. Modules 120 and 122A may perform operations described using software, hardware, firmware, or a mixture of hardware, software, and firmware residing in and/or executing at respective computing device 110. Computing device 110 may execute modules 120 and 122A with multiple processors or multiple devices. Computing device 110 may execute modules 120 and 122A as virtual machines executing on underlying hardware. Modules 120 and 122A may execute as one or more services of an operating system or computing platform. Modules 120 and 122A may execute as one or more executable programs at an application layer of a computing platform.

Computing device 110 may communicate with assistant server system 160, 3P agent server systems 170, and/or search server system 180 via network 130 to access the virtual assistant service provided by assistant server system 160, the virtual language agents provided by 3P agent server systems 170, and/or to access the search service provided by search server system 180. In the course of providing virtual assistant services, assistant server system 160 may communicate with search server system 180 via network 130 to obtain search results for providing a user of the virtual assistant service information to complete a task. In the course of providing virtual assistant services, assistant server system 160 may communicate with 3P agent server systems 170 via network 130 to engage one or more of the virtual language agents provided by 3P agent server systems 170 to provide a user of the virtual assistant service additional assistance. In the course of providing additional assistance, 3P agent server systems 170 may communicate with search server system 180 via network 130 to obtain search results for providing a user of the language agents information to complete a task.

In the example of FIG. 1, assistant server system 160 includes remote assistant module 122B and agent index 124B. Remote assistant module 122B may maintain remote agent index 124B as part of a virtual assistant service that assistant server system 160 provides via network 130 (e.g., to computing device 110). Computing device 110 includes user interface device (UID) 112, user interface (UI) module 120, local assistant module 122A, and agent index 124A. Local assistant module 122A may maintain agent index 124A as part of a virtual assistant service that executes locally at computing device 110. Remote assistant module 122B and local assistant module 122A may be referred to collectively as assistant modules 122. Local agent index 124A and remote agent index 124B may be referred to collectively as agent indices 124.

Modules 122B, 128Ab-128Nb (collectively, "3P agent modules 128b"), and 182 may perform operations described using software, hardware, firmware, or a mixture of hardware, software, and firmware residing in and/or executing at, respectively, assistant server system 160, 3P agent server systems 170, and search server system 180. Assistant server system 160, 3P agent server systems 170, and search server system 180 may execute, respectively, modules 122B, 128b, and 182 with multiple processors, multiple devices, as virtual machines executing on underlying hardware, or as one or more services of an operating system or computing platform. In some examples, modules 122B, 128b, and 182 may execute as one or more executable programs at an application layer of a computing platform of, respectively, assistant server system 160, 3P agent server systems 170, and search server system 180.

UID 112 of computing device 110 may function as an input and/or output device for computing device 110. UID 112 may be implemented using various technologies. For instance, UID 112 may function as an input device using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. In addition, UID 112 may include microphone technologies, infrared sensor technologies, or other input device technology for use in receiving user input.

UID 112 may function as output (e.g., display) device using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110. In addition, UID 112 may include speaker technologies, haptic feedback technologies, or other output device technology for use in outputting information to a user.

UID 112 may include a presence-sensitive display that may receive tactile input from a user of computing device 110. UID 112 may receive indications of tactile input by detecting one or more gestures from a user (e.g., the user touching or pointing to one or more locations of UID 112 with a finger or a stylus pen). UID 112 may present output to a user, for instance at a presence-sensitive display. UID 112 may present the output as a graphical user interface (e.g., user interface 114), which may be associated with functionality provided by computing device 110 and/or a service being accessed by computing device 110.

For example, UID 112 may present a user interface (e.g., user interface 114) related to a virtual assistant provided by local assistant module 122A and/or remote assistant module 122B that UI module 120 accesses on behalf of computing device 110. UID 112 may present a user interface related to other features of computing platforms, operating systems, applications, and/or services executing at or accessible from computing device 110 (e.g., e-mail, chat, or other electronic message applications, Internet browser applications, telephone applications, mobile or desktop operating systems, etc.).

UI module 120 may manage user interactions with UID 112 and other components of computing device 110 including interacting with assistant server system 160 so as to provide autonomous search results at UID 112. UI module 120 may cause UID 112 to output a user interface, such as user interface 114 (or other example user interfaces) for display, as a user of computing device 110 views output and/or provides input at UID 112. UI module 120 and UID 112 may receive one or more indications of input from a user as the user interacts with the user interface, at different times and when the user and computing device 110 are at different locations. UI module 120 and UID 112 may interpret inputs detected at UID 112 and may relay information about the inputs detected at UID 112 to one or more associated platforms, operating systems, applications, and/or services executing at computing device 110, for example, to cause computing device 110 to perform functions.

UI module 120 may receive information and instructions from one or more associated platforms, operating systems, applications, and/or services executing at computing device 110 and/or one or more remote computing systems, such as server systems 160 and 180. In addition, UI module 120 may act as an intermediary between the one or more associated platforms, operating systems, applications, and/or services executing at computing device 110, and various output devices of computing device 110 (e.g., speakers, LED indicators, audio or haptic output device, etc.) to produce output (e.g., a graphic, a flash of light, a sound, a haptic response, etc.) with computing device 110. In some examples, UI module 120 may perform text to speech (TTS). For instance, when provided (e.g., by another module) with text, UI module 120 may synthesize audio data to speak the test (e.g., read the text aloud).

Local assistant module 122A of computing device 110 and remote assistant module 122B of assistant server system 160 may each perform similar functions described herein for automatically executing an assistant that is configured to select agents to satisfy user input (e.g., spoken utterances, textual input, etc.) received from a user of a computing device. Remote assistant module 122B and agent index 124B represent server-side or cloud implementations of an example virtual assistant whereas local assistant module 122A and agent index 124A represent a client-side or local implementation of the example virtual assistant.

Modules 122A and 122B may each include respective software agents configured to execute as intelligent personal assistants that can perform tasks or services for an individual, such as a user of computing device 110. Modules 122A and 122B may perform these tasks or services based on user input (e.g., detected at UID 112), location awareness (e.g., based on context), and/or the ability to access other information (e.g., weather or traffic conditions, news, stock prices, sports scores, user schedules, transportation schedules, retail prices, etc.) from a variety of information sources (e.g., either stored locally at computing device 110, assistant server system 160, or obtained via the search service provided by search server system 180). Modules 122A and 122B may perform artificial intelligence and/or machine learning techniques to automatically identify and complete one or more tasks on behalf of a user.

In some examples, the assistants provided by modules 122 be referred to as first party (1P) assistants and/or 1P agents. For instance, the agents represented by modules 122 may share a common publisher and/or a common developer with an operating system of computing device 110 and/or an owner of assistant server system 160. As such, in some examples, the agents represented by modules 122 may have abilities not available to other agents, such as third party (3P) agents. In some examples, the agents represented by modules 122 may not both be 1P agents. For instance, the agent represented by local assistant module 122A may be a 1P agent whereas the agent represented by remote assistant module 122B may be a 3P agent. In some examples, the assistants provided by modules 122 may be referred to as 1P assistants (e.g., 1P computational assistants) and modules 122 may further provide one or more 1P agents (e.g., that share a common publisher and/or a common developer with the 1P computational assistants).

As discussed above, local assistant module 122A may represent a software agent configured to execute as an intelligent personal assistant that can perform tasks or services for an individual, such as a user of computing device 110. However, in some examples, it may be desirable that the assistant utilize other agents to perform tasks or services for the individual. For instance, in certain scenarios, it may be desirable for the assistant to use one or more 3P agents to perform tasks or services the user of computing device 110. As one example, a 3P agent may be able to perform a particular task more efficiently (e.g., using less computational power, system resources, etc.) than the assistant.

In the example of FIG. 1, 3P agent server systems 170 include remote 3P agent modules 128b. Remote 3P agent modules 128b may perform similar functions described below with respect to local 3P agent modules 128a to automatically execute an agent that is configured to satisfy utterances received from a user of a computing device, such as computing device 110. In other words, remote 3P agent modules 128b represent server-side or cloud implementations of example 3P agents whereas local 3P agent modules 128*a* represent client-side or local implementations of the example 3P agents.

In some examples, each of modules 128*a* and 128*b* (collectively, "modules 128") may represent software agents configured to execute as intelligent personal assistants that can perform tasks or services for an individual, such as a user of computing device 110. In some examples, each of modules 128 may represent software agents that may be utilized by the assistants provided by modules 122. In some examples, the assistants and/or agents provided by modules 128 be referred to as third party (3P) assistants and/or 3P agents. For instance, the assistants and/or agents represented by modules 128 may not share a common publisher with an operating system of computing device 110 and/or an owner of assistant server system 160. As such, in some examples, the assistants and/or agents represented by modules 128 may not have abilities that are available to other assistants and/or agents, such as first party (1P) assistants and/or agents.

In some examples, the 3P agents may be configured for use without user involvement. In some examples, some 3P agents may require configuration prior to being used. For instance, when installing smart lighting dimmers in their home, the user may configure a 3P agent provided by a manufacturer of smart lighting dimmers for use. The configuration process may involve associating the 3P agent with the 1P assistant (e.g., the user may provide account information for the 3P agent to the 1P assistant) and authorizing (e.g., by the user) the 1P assistant to communicate with the 3P agent on the user's behalf.

Search module 182 may execute a search for information determined to be relevant to a search query that search module 182 automatically generates (e.g., based on contextual information associated with computing device 110) or that search module 182 receives from assistant server system 160, 3P agent server systems 170, or computing device 110 (e.g., as part of a task that a virtual assistant is completing on behalf of a user of computing device 110). Search module 182 may conduct an Internet search or local device search based on a search query to identify information related to the search query. After executing a search, search module 182 may output the information returned from the search (e.g., the search results) to assistant server system 160, one or more of 3P agent server systems 170, or computing device 110.

One or more components of system 100, such as local assistant module 122A and/or remote assistant module 122B, may maintain agent index 124A and/or agent index 124B (collectively, "agent indices 124") to store information related to agents that are available to an individual, such as a user of computing device 110. In some examples, agent indices 124 may store, for each agent, an agent description and a list of capabilities in a semi-structured index of agent information. For instance, agent indices 124 may contain a single document with information for each available agent. A document included in agent indices 124 for a particular agent may be constructed from information provided by a developer of the particular agent. Some example information fields that may be included in the document, or which may be used to construct the document, include but are not limited to: a description of the agent, one or more entry points of the agent, a category of the agent, one or more triggering phrases of the agent, a website associated with the agent, an indication of a voice to use when synthesizing audio data based on text generated by the agent, and/or a list of the agent's capabilities (e.g., a list of tasks, or task types, that the agent is capable of performing). In some examples, one or more of the information fields may be written in free-form natural language. In some examples, one or more of the information fields may be selected from a pre-defined list. For instance, the category field may be selected from a pre-defined set of categories (e.g., games, productivity, communication). In some examples, an entry point of an agent may be a device type(s) used to interface with the agent (e.g., cell phone). In some examples, an entry point of an agent may be a resource address or other argument of the agent.

In some examples, agent indices 124 may store information related to the use and/or the performance of the available agents. For instance, agent indices 124 may include an agent-quality score for each available agent. In some examples, the agent-quality scores may be determined based on one or more of: whether a particular agent is selected more often than competing agents, whether the agent's developer has produced other high quality agents, whether the agent's developer has good (or bad) spam scores on other user properties, and whether users typically abandon the agent in the middle of execution. In some examples, the agent-quality scores may be represented as a value between 0 and 1, inclusive.

Agent indices 124 may provide a mapping between trigger phrases and agents. As discussed above, a developer of a particular agent may provide one or more trigger phrases to be associated with the particular agent. In some examples, to improve the quality of agent selection, local assistant module 122A may expand upon the provided trigger phrases. For instance, local assistant module 122A may expand a trigger phrase by expanding the trigger phrase's structure and the synonyms of the key concept of the trigger phrase. Regarding structure expansion, local assistant module 122A may insert terms, which are commonly used in users' natural language utterances like "please", "could you" etc., in between the compound of the triggering phase, and then permutate the compound of the phrase.

In some cases, the concept of the capabilities of a trigger phrase can be represented as verb and noun. As such, in some examples, local assistant module 122A may examine a query log of web searches, tag the verb and noun for each query (e.g., using a natural language framework), and build verb clusters based on the tagged verbs and nouns. Within each cluster, all verbs may be considered to have a similar meaning in the context of the same noun. As such, using the verb cluster model, local assistance module 122A may expand the synonyms of verbs in a triggering phrase associated with an agent, and store the results in agent indices 124 (i.e., as alternate triggering phrases for the agent).

In some examples, some trigger phrases may also contain variables that represent relevant sets of data. These data sets may be defined by schema.org types or as a custom specification by the developer. These triggering and parameter value sets are fed into a training system for a text-matching system. The training system may convert the specified patterns into a set of rules, represented in an efficient for online query-matching. Local assistance module 122A may also maintain a mapping of text-matching system's rules to the applicable agents.

One or more components to system 100, such as search module 182, may attach metadata about the agent to any associated web site in the web search index. This metadata may include the agent's id and the associated agent entry point.

When a user interacts with an agent, one or more components to system 100 may log details of the interaction to the user's personal history. As discussed above, the logging may be subject to one or more user controls such that the user may disable logging of agent interactions. In particular, the one or more components of system 100 may only log the details after receiving explicit authorization from the user.

In operation, local assistant module 122A may receive, from UI module 120, an indication of a user input provided by a user of computing device 110. As one example, local assistant module 122A may receive an indication of a voice input that corresponds to an utterance provided by a user of computing device 110. As another example, local assistant module 122A may receive an indication of text input provided by a user of computing device 110 (e.g., at a physical and/or a virtual keyboard). In accordance with one or more techniques of this disclosure, local assistant module 122 may select an agent from a plurality of agents to satisfy the utterance. For instance, local assistant module 122A may determine whether to satisfy the user utterance using a 1P agent (i.e., a 1P agent provided by local assistant module 122A), a 3P agent (i.e., a 3P agent provided by one of 3P agent modules 128), or some combination of 1P agents and 3P agents.

Local assistant module 122A may base the agent selection on an analysis of the utterance. As one example, local assistant module 122A may select, at least initially, a 1P language agent where it is not possible to satisfy the utterance solely using a 3P language agent. As another example, local assistant module 122A may identify a task based on the utterance and select an agent from the available agents (e.g., the 1P agents and the 3P agents) based on rankings of the agents and/or the capabilities of the available agents to perform the task. As another example, local assistant module 122A may determine (e.g., based on data included in agent index 124A) whether the voice input includes one or more pre-determined trigger phrases that are associated with 1P agents or one or more pre-determined trigger phrases that are associated with 3P agents.

As discussed above, local assistant module 122A may base the agent selection on whether the voice input includes one or more pre-determined trigger phrases. For instance, if the voice input includes one or more pre-determined trigger phrases that are associated with 1P agents, local assistant module 122A may select one or more of the 1P agents to satisfy the utterance. In some examples, one or more of the 1P agents are selected, the resulting engagement may be referred to as a 1P experience.

However, if the voice input includes one or more pre-determined trigger phrases that are associated with 3P agents, local assistant module 122A may select one or more of the 3P agents to satisfy the utterance. For instance, local assistant module 122A may select a 3P agent of the 3P agents that is associated with the trigger phrases included in the voice input. To perform 3P agent selection, local assistant module 122A may rank one or more 3P agents based on the utterance. In some examples, local assistant module 122A may rank all known 3P agents. In some examples, local assistant module 122A may rank a subset of all known 3P agents. For instance, local assistant module 122A may rank 3P agents that are pre-configured for use by the user of computing device 110.

As discussed above, local assistant module 122A, may select a 3P agent based on rankings. For instance, local assistant module 122A may select a 3P agent with the highest ranking to satisfy the utterance. In some examples, such as where there is a tie in the rankings and/or if the ranking of the 3P agent with the highest ranking is less than a ranking threshold, local assistant module 122A may solicit user input to select a 3P language agent to satisfy the utterance. For instance, local assistant module 122A may cause UI module 120 to output a user interface requesting that the user select a 3P agent from the top N (e.g., 2, 3, 4, 5, etc.) ranked 3P agents to satisfy the utterance.

The selected agent (a 1P agent, a 3P agent, or some combination of 1P language agents and 3P agents) may attempt to satisfy the utterance. For instance, the selected agent may perform one or more actions (e.g., output useful information based on the utterance, respond to a user's needs indicated by the utterance, or otherwise perform certain operations to help the user complete a variety of real-world or virtual tasks based on the utterance) to satisfy the utterance.

As discussed above, in some examples, the agents represented by modules 122 may not both be 1P agents. For example, the agent represented by local assistant module 122A may be a 1P agent whereas the agent represented by remote assistant module 122B may be a 3P agent. In some of such examples, local assistant module 122A may utilize 3P remote assistant module 122B to perform some (or all) of the 3P agent selection, identification, ranking, and/or invoking of other 3P agents. In some of such examples, local assistant module 122A may not be able utilize 3P remote assistant module 122B to perform some (or all) of the 3P agent selection, identification, ranking, and/or invoking of other 3P agents and may perform such tasks locally.

It will be appreciated that improved operation of one or more of computing device 110, assistant server system 160, and 3P agent server systems 170 is obtained according to the above description. As one example, by identifying a preferred agent to execute a task provided by a user, generalized searching and complex query rewriting can be reduced. This in turn reduces use of bandwidth and data transmission, reduces use of temporary volatile memory, reduces battery drain, etc. Furthermore, in certain embodiments, optimizing device performance and/or minimizing cellular data usage can be highly weighted features for ranking agents, such that selection of an agent based on these criteria provides the desired direct improvements in device performance and/or reduced data usage. As another example, by providing a single assistant/agent (e.g., the 1P assistant) to initially process utterances (e.g., identify tasks and select agent(s) for performing the task) the computational load may be reduced. For instance, as opposed to having several agents monitor, process, and satisfy incoming utterances, which would consume significant amounts of system resources (e.g., CPU cycles, power consumption, etc.), the techniques of this disclosure enable a single assistant to initially process utterances and invoke 3P agents as needed. As such, the techniques of this disclosure enable the benefits of having multiple agents available to satisfy utterances without the technical drawbacks of having multiple agents involved at every step of the utterance processing.

Figure 2:
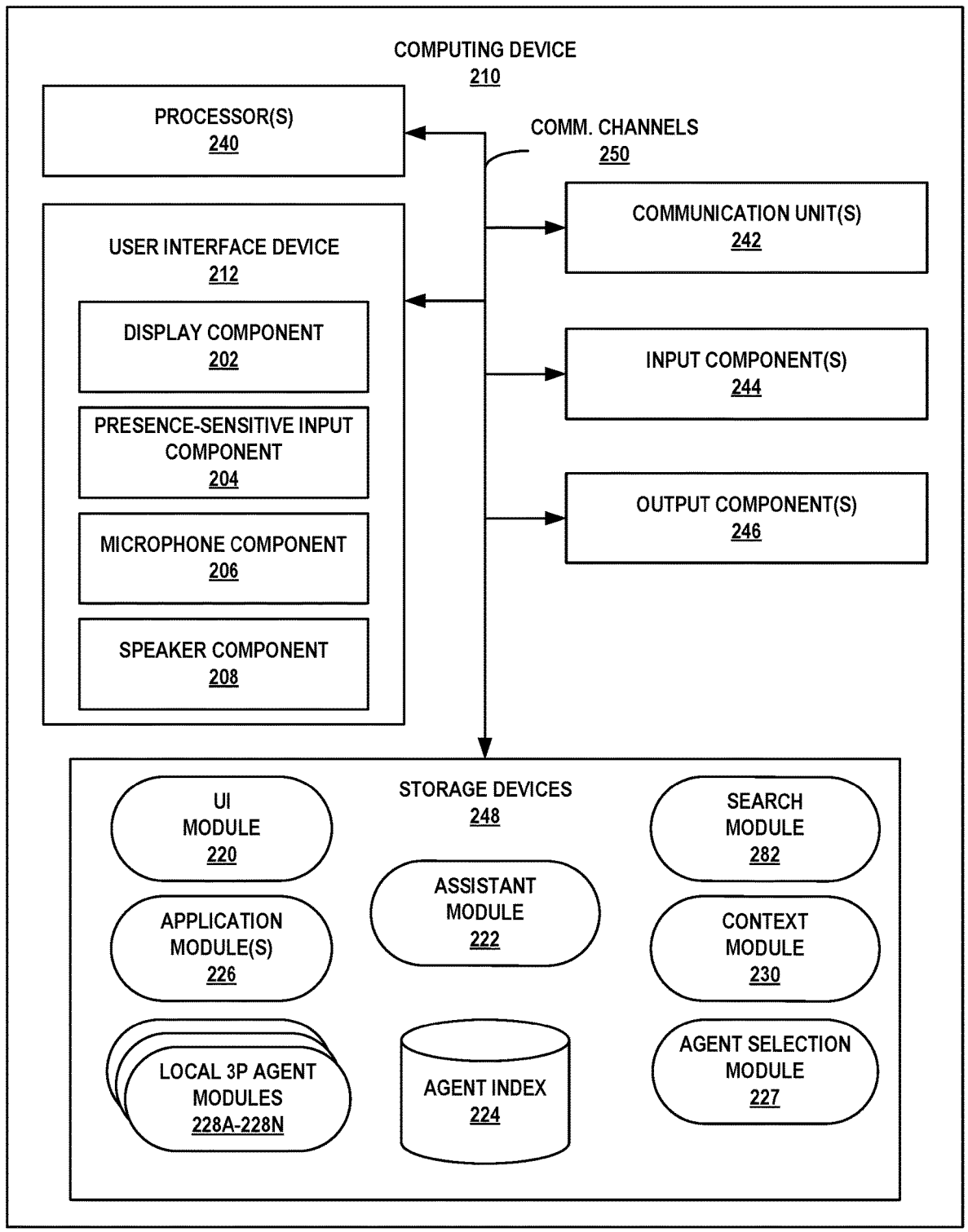
FIG. 2 is a block diagram illustrating an example computing device that is configured to execute an example virtual assistant, in accordance with one or more aspects of the present disclosure.

FIG. 2 is a block diagram illustrating an example computing device that is configured to execute an example virtual assistant, in accordance with one or more aspects of the present disclosure. Computing device 210 of FIG. 2 is described below as an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes user interface device (USD) 212, one or more processors 240, one or more communication units 242, one or more input components 244, one or more output components 246, and one or more storage components 248. USD 212 includes display component 202, presence-sensitive input component 204, microphone component 206, and speaker component 208. Storage components 248 of computing device 210 include UI module 220, assistant module 222, search module 282, one or more application modules 226, context module 230, and agent index 224.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices (e.g., assistant server system 160 and/or search server system 180 of system 100 of FIG. 1) via one or more wired and/or wireless networks by transmitting and/or receiving network signals on one or more networks (e.g., network 130 of system 100 of FIG. 1). Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, text, audio, image, and video input. Input components 242 of computing device 210, in one example, includes a presence-sensitive input device (e.g., a touch sensitive screen, a PSD), mouse, keyboard, voice responsive system, camera, microphone or any other type of device for detecting input from a human or machine. In some examples, input components 242 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, step counter sensor.

One or more output components 246 of computing device 110 may generate output. Examples of output are tactile, audio, and video output. Output components 246 of computing device 210, in one example, includes a presence-sensitive display, sound card, video graphics adapter card, speaker, cathode ray tube (CRT) monitor, liquid crystal display (LCD), or any other type of device for generating output to a human or machine.

UID 212 of computing device 210 may be similar to UID 112 of computing device 110 and includes display component 202, presence-sensitive input component 204, microphone component 206, and speaker component 208. Display component 202 may be a screen at which information is displayed by USD 212 while presence-sensitive input component 204 may detect an object at and/or near display component 202. Speaker component 208 may be a speaker from which audible information is played by UID 212 while microphone component 206 may detect audible input provided at and/or near display component 202 and/or speaker component 208.

While illustrated as an internal component of computing device 210, UID 212 may also represent an external component that shares a data path with computing device 210 for transmitting and/or receiving input and output. For instance, in one example, UID 212 represents a built-in component of computing device 210 located within and physically connected to the external packaging of computing device 210 (e.g., a screen on a mobile phone). In another example, UID 212 represents an external component of computing device 210 located outside and physically separated from the packaging or housing of computing device 210 (e.g., a monitor, a projector, etc. that shares a wired and/or wireless data path with computing device 210).

As one example range, presence-sensitive input component 204 may detect an object, such as a finger or stylus that is within two inches or less of display component 202. Presence-sensitive input component 204 may determine a location (e.g., an [x, y] coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202. In the example of FIG. 2, PSD 212 may present a user interface (such as graphical user interface 114 of FIG. 1).

Speaker component 208 may comprise a speaker built-in to a housing of computing device 210 and in some examples, may be a speaker built-in to a set of wired or wireless headphones that are operably coupled to computing device 210. Microphone component 206 may detect audible input occurring at or near UID 212. Microphone component 206 may perform various noise cancellation techniques to remove background noise and isolate user speech from a detected audio signal.

UID 212 of computing device 210 may detect two-dimensional and/or three-dimensional gestures as input from a user of computing device 210. For instance, a sensor of UID 212 may detect a user's movement (e.g., moving a hand, an arm, a pen, a stylus, etc.) within a threshold distance of the sensor of UID 212. UID 212 may determine a two or three-dimensional vector representation of the movement and correlate the vector representation to a gesture input (e.g., a hand-wave, a pinch, a clap, a pen stroke, etc.) that has multiple dimensions. In other words, UID 212 can detect a multi-dimension gesture without requiring the user to gesture at or near a screen or surface at which UID 212 outputs information for display. Instead, UID 212 can detect a multi-dimensional gesture performed at or near a sensor which may or may not be located near the screen or surface at which UID 212 outputs information for display.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 220, 222, 226, 230, and 282 may be operable by processors 240 to perform various actions, operations, or functions of computing device 210. For example, processors 240 of computing device 210 may retrieve and execute instructions stored by storage components 248 that cause processors 240 to perform the operations modules 220, 222, 226, 230, and 282. The instructions, when executed by processors 240, may cause computing device 210 to store information within storage components 248.

One or more storage components 248 within computing device 210 may store information for processing during operation of computing device 210 (e.g., computing device 210 may store data accessed by modules 220, 222, 226, 230, and 282 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220, 222, 226, 230, and 282 and data store 224. Storage components 248 may include a memory configured to store data or other information associated with modules 220, 222, 226, 230, and 282 and data store 224.

UI module 220 may include all functionality of UI module 120 of computing device 110 of FIG. 1 and may perform similar operations as UI module 120 for managing a user interface (e.g., user interface 114) that computing device 210 provides at USD 212 for example, for facilitating interactions between a user of computing device 110 and assistant module 222. For example, UI module 220 of computing device 210 may receive information from assistant module 222 that includes instructions for outputting (e.g., displaying or playing audio) an assistant user interface (e.g., user interface 114). UI module 220 may receive the information from assistant module 222 over communication channels 250 and use the data to generate a user interface. UI module 220 may transmit a display or audible output command and associated data over communication channels 250 to cause UID 212 to present the user interface at UID 212.

In some examples, UI module 220 may receive an indication of one or more user inputs detected at UID 212 and may output information about the user inputs to assistant module 222. For example, UID 212 may detect a voice input from a user and send data about the voice input to UI module 220.

UI module 220 may send an indication of the voice input to assistant module 222 for further interpretation. Assistant module 222 may determine, based on the voice input, that the detected voice input represents a user request for assistant module 222 to perform one or more tasks.

UI module 220 may be capable of performing text to speech (TTS). For instance, when provided (e.g., by the assistant or an agent) with text, UI module 220 may synthesize audio data to speak the test (e.g., read the text aloud). UI module 220 may be capable of performing TTS using a plurality of different voices.

Application modules 226 represent all the various individual applications and services executing at and accessible from computing device 210 that may be accessed by an assistant, such as assistant module 222, to provide user with information and/or perform a task. A user of computing device 210 may interact with a user interface associated with one or more application modules 226 to cause computing device 210 to perform a function. Numerous examples of application modules 226 may exist and include, a fitness application, a calendar application, a search application, a map or navigation application, a transportation service application (e.g., a bus or train tracking application), a social media application, a game application, an e-mail application, a chat or messaging application, an Internet browser application, or any and all other applications that may execute at computing device 210.

Search module 282 of computing device 210 may perform integrated search functions on behalf of computing device 210. Search module 282 may be invoked by UI module 220, one or more of application modules 226, and/or assistant module 222 to perform search operations on their behalf. When invoked, search module 282 may perform search functions, such as generating search queries and executing searches based on generated search queries across various local and remote information sources. Search module 282 may provide results of executed searches to the invoking component or module. That is, search module 282 may output search results to UI module 220, assistant module 222, and/or application modules 226 in response to an invoking command.

Context module 230 may collect contextual information associated with computing device 210 to define a context of computing device 210. Specifically, context module 210 is primarily used by assistant module 222 to define a context of computing device 210 that specifies the characteristics of the physical and/or virtual environment of computing device 210 and a user of computing device 210 at a particular time.

As used throughout the disclosure, the term "contextual information" is used to describe any information that can be used by context module 230 to define the virtual and/or physical environmental characteristics that a computing device, and the user of the computing device, may experience at a particular time. Examples of contextual information are numerous and may include: sensor information obtained by sensors (e.g., position sensors, accelerometers, gyros, barometers, ambient light sensors, proximity sensors, microphones, and any other sensor) of computing device 210, communication information (e.g., text based communications, audible communications, video communications, etc.) sent and received by communication modules of computing device 210, and application usage information associated with applications executing at computing device 210 (e.g., application data associated with applications, Internet search histories, text communications, voice and video communications, calendar information, social media posts and related information, etc.). Further examples of contextual information include signals and information obtained from transmitting devices that are external to computing device 210. For example, context module 230 may receive, via a radio or communication unit of computing device 210, beacon information transmitted from external beacons located at or near a physical location of a merchant.

Assistant module 222 may include all functionality of local assistant module 122A of computing device 110 of FIG. 1 and may perform similar operations as local assistant module 122A for providing an assistant. In some examples, assistant module 222 may execute locally (e.g., at processors 240) to provide assistant functions. In some examples, assistant module 222 may act as an interface to a remote assistance service accessible to computing device 210. For example, assistant module 222 may be an interface or application programming interface (API) to remote assistance module 122B of assistant server system 160 of FIG. 1.

Agent selection module 227 may include functionality to select one or more agents to satisfy a given utterance. In some examples, agent selection module 227 may be a standalone module. In some examples, agent selection module 227 may be included in assistant module 222.

Similar to agent indices 124A and 124B of system 100 of FIG. 1, agent index 224 may store information related to agents, such as 3P agents. Assistant module 222 and/or agent selection module 227 may rely on the information stored at agent index 224, in addition to any information provided by context module 230 and/or search module 282, to perform assistant tasks and/or select agents for utterance satisfaction.

Agent selection module 227 may select one or more agents to satisfy a user utterance. As discussed above, some utterances (i.e., user requests) cannot be directly handed off to 3P agents, such as utterances that need special assistance (e.g., assistance from a publisher of assistant module 222). Situations where special assistance is needed to satisfy an utterance may be referred to as 1P experiences because the publisher of assistant module 222 may implement (at least part of, but not always all of) the logic necessary to satisfy the utterance. Two examples of utterances that may need special assistance are home automation and overly broad queries.

An example of a home automation utterance is "set my downstairs thermostat to 71". The publisher of assistant module 222 may enable users to register their home automation equipment, such as with assistant module 222. To satisfy the above utterance, assistant module 222 may look up the configuration information of the user's home automation equipment, and then send an appropriate request to the automation system (e.g., downstairs thermostat) based on to details. As the special assistance of knowledge of and/or access to the user's home automation equipment is needed to satisfy the utterance, agent selection module 227 may select a 1P agent to satisfy the utterance. In other words, this process may be implemented as 1P experience.

An example of an overly broad utterance is "I am bored". There are many potential ways to satisfy that utterance, but adequate satisfaction depends on the user's preferences at that time. As such, agent selection module 227 may select a 1P experience. In such a 1P experience, assistant module 222 may ask the user a series of questions to determine what they want to do. For instance, assistant module 222 may say "Do you feel like a movie or a game?" If the user responds by stating that they feel like a game, assistant module 222 may say "Ok, do you like strategy or fantasy games?

For these and other similar situations, the publisher of assistant module 222 may provide a set of 1P solutions built internally. In some examples, the 1P solutions may be referred to as 1P agents. The 1P agents may be associated with (i.e., identified by) a set of 1P triggering phrases identified by the publisher of assistant module 222.

In general, 1P experiences may follow two basic models. In the first model, the publisher of assistant module 222 may handle the full experience. One such example would be for the utterance "Ok assistant, where were you made?" An internally developed experience may respond with a fun response about how and where the assistant was made.

The second model is where the publisher of assistant module 222 implements some dialog to determine the exact parameters for a task and then transfers control over to a 3P agent or API. To continue the "I am bored" example above, if the dialog finds that the user would like to a play a strategy game, agent selection module 227 may invoke an agent that implements such a game. As another example, if the utterance is "book a taxi", agent selection module 227 may initially select assistant module 222 (i.e., initially trigger a 1P experience) to asks the user for necessary information such as pick-up and drop-off locations, time, and taxi class. In some examples, agent selection module 227 may select a 3P agent capable of booking a taxi and assistant module 222 may pass the gathered information to the selected 3P agent. In some examples, assistant module 222 may directly pass the gathered information to an external API of an entity capable of booking a taxi. In either of these ways, agent selection module 227 may broker a referral to a 3P agent.

In operation, a user of computing device 210 may provide an utterance at UID 212, which may generate audio data based on the utterance. Some example utterances include, but are not limited to, "I need a ride to the airport", "tell me a joke", "show me the recipe for beef wellington." In some instances, the utterance includes an identification of the 3P assistant that the user wishes to execute the action, such as "Order a small cheese pizza using the GoPizza app." In many other instances, no explicit reference to a 3P agent is made by the user, in which case there is a need to identify candidate 3P agents and select a preferred 3P agent from those candidates.

Agent selection module 227 may select one or more agents to satisfy the utterance. For instance, agent selection module 227 may determine whether the utterance include any trigger phrases associated with 1P agents or 3P agents. If the utterance matches a 1P triggering phrase, agent selection module 227 may execute the 1P experience. For instance, agent selection module 227 may cause assistant module 222 to satisfy the utterance. If the phrase matches a 3P experience, agent selection module 227 may then send an agent-search request to a service engine. The agent-search request may contain the user utterance (i.e., audio data corresponding to the utterance), any matching triggering phrases, and user context determined by context module 230 (e.g., a unique identifier of the user, a location of the user, etc.). For purposes of simplicity, the service engine may be a component of agent selection module 227 and actions performed by agent selection module 227 may, in some examples, be performed by a separate service engine.

Agent selection module 227 may consult agent index 224 based on the utterance and any matching triggering phrases. Agent selection module 227 may identify agent documents in agent index 224 that match either the utterance or the triggering phrases. Agent selection module 227 may rank the identified agent documents (e.g., based on a capability level to satisfy the utterance). For instance, agent selection module 227 may multiply a text-match score with an agent-quality score. As discussed above, the agent-quality score may be stored in agent index 224. The text-match score may be a weighted sum of the matches between the text in the utterance and the text in the agent document. In some examples, agent selection module 227 may give inside the title field, triggering phrases, or category a high weight. In some examples, agent selection module 227 may give matches in the description are given a lower weight.

In some examples, agent selection module 227 may also send the utterance through a normal web search (i.e., cause search module 282 to search the web based on the utterance). In some examples, agent selection module 227 may also send the utterance through a normal web search in parallel with the consultation of agent index 224.

Agent selection module 227 may analyze the rankings and/or the results from the web search to select an agent to satisfy the utterance. For instance, agent selection module 227 may inspect the web results to determine whether there are web page results associated with agents. If there are web page results associated with agents, agent selection module 227 may, insert the agents associated with the web page results into the ranked results (if said agents are not already included in the ranked results). Agent selection module 227 may boost the agent's rankings according to the strength of the web score. In some examples, agent selection module 227 may also then query a personal history store to determine whether the user has interacted with any of the agents in the result set. If so, agent selection module 227 may we give those agents a boost (i.e., increased ranking) depending on how often the strength of the user's history with them.

Agent selection module 227 may select a 3P agent to satisfy the utterance based on this final ranked set of agent results. For instance, agent selection module 227 may select a 3P agent with the highest ranking to satisfy the utterance. In some examples, such as where there is a tie in the rankings and/or if the ranking of the 3P agent with the highest ranking is less than a ranking threshold, agent selection module 227 may solicit user input to select a 3P language agent to satisfy the utterance. For instance, agent selection module 227 may cause UI module 220 to output a user interface (i.e., a selection UI) requesting that the user select a 3P agent from N (e.g., 2, 3, 4, 5, etc.) moderately ranked 3P agents to satisfy the utterance. In some examples, the N moderately ranked 3P agents may include the top N ranked agents. In some examples, the N moderately ranked 3P agents may include agents other than the top N ranked agents.

Agent selection module 227 can examine attributes of the agents and/or obtain results from various 3P agents, rank those results, then invoke (i.e., select) the 3P agent providing the highest ranked result. For instance, if the utterance is to "order a pizza", agent selection module 227 may determine the user's current location, determine which source of pizza is closest to the user's current location, and rank the agent associated with that current location highest. Similarly, agent selection module 227 can poll multiple 3P agents on price of an item, then provide the agent to permit the user to complete the purchase based on the lowest price. Finally, agent selection module 227 can first determine that no 1P agent can fulfill the task, try multiple 3P agents to see if they can, and assuming only one or a few of them can, provide only those agents as options to the user for implementing the task.

The selected agent (a 1P agent, a 3P agent, or some combination of 1P language agents and 3P agents) may attempt to satisfy the utterance. For instance, agent selection module 227 may output a request to an entry point of the selected agent, which may be determined by consulting agent index 224. To attempt satisfy the utterance, the selected agent may perform one or more actions (e.g., output useful information based on the utterance, respond to a user's needs indicated by the utterance, or otherwise perform certain operations to help the user complete a variety of real-world or virtual tasks based on the utterance).

In some examples, there may be an indication of the type of agent (1P vs. 3P) that is performing actions. For instance, where the one or more actions include "speaking" with the user, 1P agents and 3P agents may utilize different voices. As one example, 1P agents may all utilize a reserved voice of a plurality of voices and 3P agents may utilize other voices of the plurality of voices, but may be prohibited from using the reserved voice.

In some examples, agent selection module 227 may cause assistant module 222 to request user feedback on how well an agent just fulfilled their request. For instance, assistant module 222 may say "You just interacted with the City Transit Schedule agent. In one or two words, how well did it work?" Assistant module 222 may determine, based on the user's response, whether it was a good or bad experience (e.g., using sentiment analysis). Assistant module 222 may determine a score of the experience, and feed the determined score back into ranking. For instance, assistant module 222 may modify the agent-quality score of the agent that fulfilled the request based on the user's feedback about the fulfillment. In this way, the techniques of this disclosure enable agent selection module 227 to select agents based on how well the agents have functioned in the past.

As discussed above, in some instances, the utterance includes an identification of the 3P assistant that the user wishes to execute the action, such as "Order a small cheese pizza using the GoPizza app." In many other instances, no explicit reference to a 3P agent is made by the user, in which case there is a need to identify candidate 3P agents and select a preferred 3P agent from those candidates. The complexity with such situations is that there may be multiple agents that may be able to order the user a pizza. As such, if there are multiple matching agents, the user may be asked to select one of the matching agents to satisfy the utterance. For instance, agent selection module 227 may output a selection UI asking the user to select between a Pizza House agent, and a Pizza4U agent.

Figure 3:
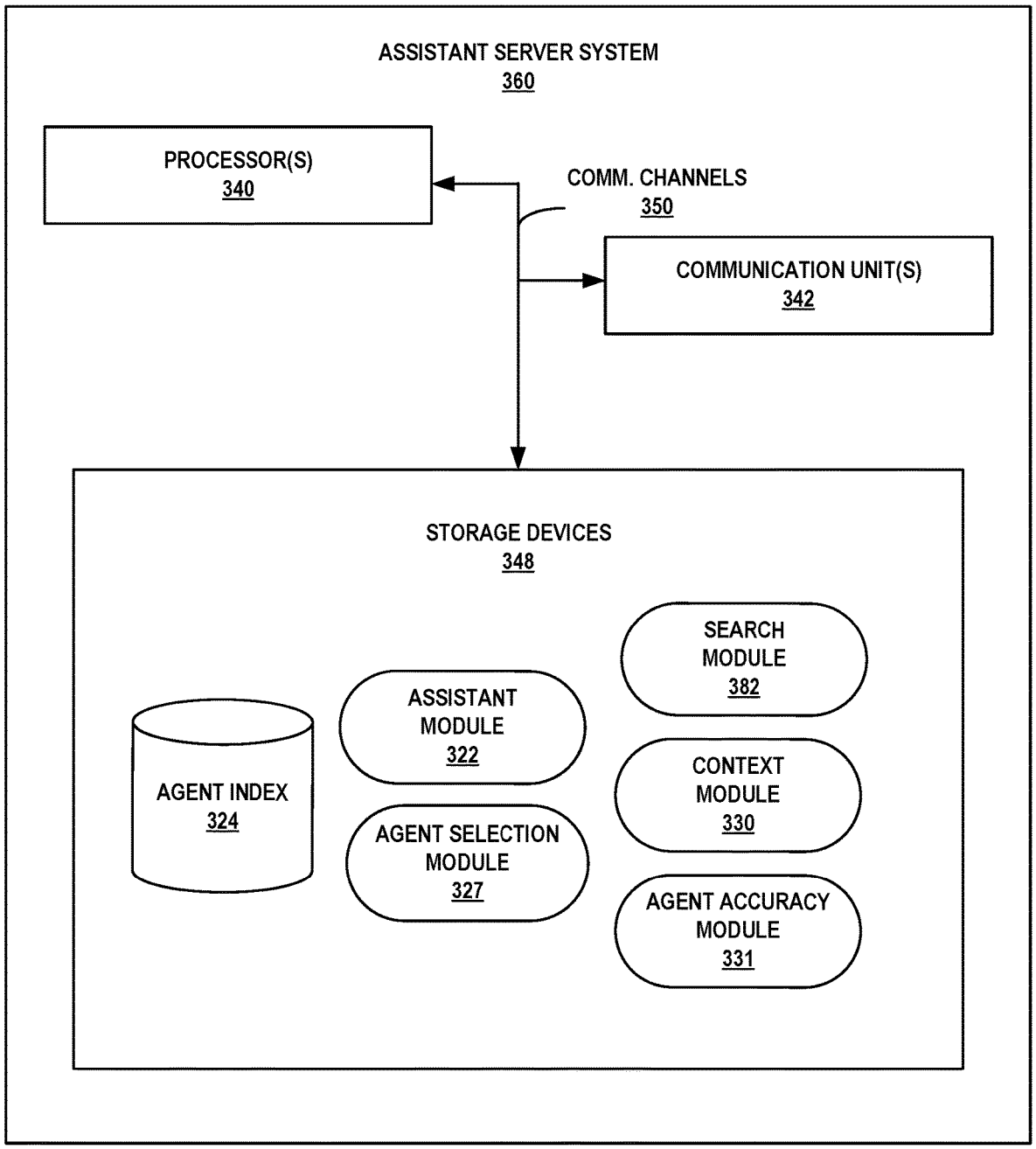
FIG. 3 is a block diagram illustrating an example computing system that is configured to execute an example virtual assistant, in accordance with one or more aspects of the present disclosure.

FIG. 3 is a block diagram illustrating an example computing system that is configured to execute an example virtual assistant, in accordance with one or more aspects of the present disclosure. Assistant server system 360 of FIG. 3 is described below as an example of assistant server system 160 of FIG. 1. FIG. 3 illustrates only one particular example of assistant server system 360, and many other examples of assistant server system 360 may be used in other instances and may include a subset of the components included in example assistant server system 360 or may include additional components not shown in FIG. 3.

As shown in the example of FIG. 3, assistant server system 360 includes user one or more processors 340, one or more communication units 342, and one or more storage components 348. Storage components 348 include assistant module 322, search module 382, context module 330, and user agent index 324.

Processors 340 are analogous to processors 240 of computing system 210 of FIG. 2. Communication units 342 are analogous to communication units 242 of computing system 210 of FIG. 2. Storage devices 348 are analogous to storage devices 248 of computing system 210 of FIG. 2. Communication channels 350 are analogous to communication channels 250 of computing system 210 of FIG. 2 and may therefore interconnect each of the components 340, 342, and 348 for inter-component communications. In some examples, communication channels 350 may include a system bus, a network connection, an inter-process communication data structure, or any other method for communicating data.

Search module 382 of assistant server system 360 is analogous to search module 282 of computing device 210 and may perform integrated search functions on behalf of assistant server system 360. That is, search module 382 may perform search operations on behalf of assistant module 322. In some examples, search module 382 may interface with external search systems, such as search system 180 to perform search operations on behalf of assistant module 322. When invoked, search module 382 may perform search functions, such as generating search queries and executing searches based on generated search queries across various local and remote information sources. Search module 382 may provide results of executed searches to the invoking component or module. That is, search module 382 may output search results to assistant module 322.

Context module 330 of assistant server system 360 is analogous to context module 230 of computing device 210. Context module 330 may collect contextual information associated with computing devices, such as computing device 110 of FIG. 1 and computing device 210 of FIG. 2, to define a context of the computing device. Context module 330 may primarily be used by assistant module 322 and/or search module 382 to define a context of a computing device interfacing and accessing a service provided by assistant server system 360. The context may specify the characteristics of the physical and/or virtual environment of the computing device and a user of the computing device at a particular time.

Assistant module 322 may include all functionality of local assistant module 122A and remote assistant module 122B of FIG. 1, as well as assistant module 222 of computing device 210 of FIG. 2. Assistant module 322 may perform similar operations as remote assistant module 122B for providing an assistant service that is accessible via assistant server system 360. That is, assistant module 322 may act as an interface to a remote assistance service accessible to a computing device that is communicating over a network with assistant server system 360. For example, assistant module 322 may be an interface or API to remote assistance module 122B of assistant server system 160 of FIG. 1.

Similar to agent index 224 of FIG. 2, agent index 324 may store information related to agents, such as 3P agents. Assistant module 322 and/or agent selection module 327 may rely on the information stored at agent index 324, in addition to any information provided by context module 330 and/or search module 482, to perform assistant tasks and/or select agents for utterance satisfaction.

In general, agent descriptions and triggering phrases may only give a relatively small amount of information about an agent. The more information available about an agent, the better agent selection modules (e.g., agent selection module 224 and/or agent selection module 324) can select the agents to applicable user utterances. In accordance with one or more techniques of this disclosure, agent accuracy module 331 may gather additional information about agents. In some examples, agent accuracy module 331 may be considered to be an automated agent crawler. For instance, agent accuracy module 331 may query each agent and store the information it receives. As one example, agent accuracy module 331 may send a request to the default agent entry point and will receive back a description from the agent about its capabilities. Agent accuracy module 331 may store this received information in agent index 324 (i.e., to improve targeting).

In some examples, assistant server system 360 may receive inventory information for agents, where applicable. As one example, an agent for an online grocery store can provide assistant server system 360 a data feed (e.g., a structured data feed) of their products, including description, price, quantities, etc. An agent selection module (e.g., agent selection module 224 and/or agent selection module 324) may access this data as part of selecting an agent to satisfy a user's utterance. These techniques may enable the system to better respond to queries such as "order a bottle of prosecco". In such a situation, an agent selection module can match this utterance to an agent more confidently if the agent has provided their real-time inventory and the inventory indicated that the agent sells prosecco and has prosecco in stock.

In some examples, assistant server system 360 may provide an agent directory that users may browse to discover/find agents that they might like to use. The directory may have a description of each agent, a list of capabilities (in natural language; e.g., "you can use this agent to order a taxi", "you can use this agent to find food recipes"). If the user finds an agent in the directory that they would like to use, the user may select the agent and the agent may be made available to the user. For instance, assistant module 322 may add the agent into agent index 224 and or agent index 324. As such, agent selection module 227 and/or agent selection module 327 may select the added agent to satisfy future utterances. In some examples, one or more agents may be added into agent index 224 or agent index 324 without user selection. In some of such examples, agent selection module 227 and/or agent selection module 327 may be able to select and/or suggest agents that have not been selected by a user to satisfy user utterances. In some examples, agent selection module 227 and/or agent selection module 327 may further rank agents based on whether they were selected by the user.

In some examples, one or more of the agents listed in the agent directory may be free (i.e., provided at no cost). In some examples, one or more of the agents listed in the agent directory may not be free (i.e., the user may have to pay money or some other consideration in order to use the agent).

In some examples, the agent directory may collect user reviews and ratings. The collected user reviews and ratings may be used to modify the agent quality scores. As one example, when an agent receives positive reviews and/or ratings, agent accuracy module 331 may increase the agent's agent quality score in agent index 224 or agent index 324. As another example, when an agent receives negative reviews and/or ratings, agent accuracy module 331 may decrease the agent's agent quality score in agent index 224 or agent index 324.

Figure 4:
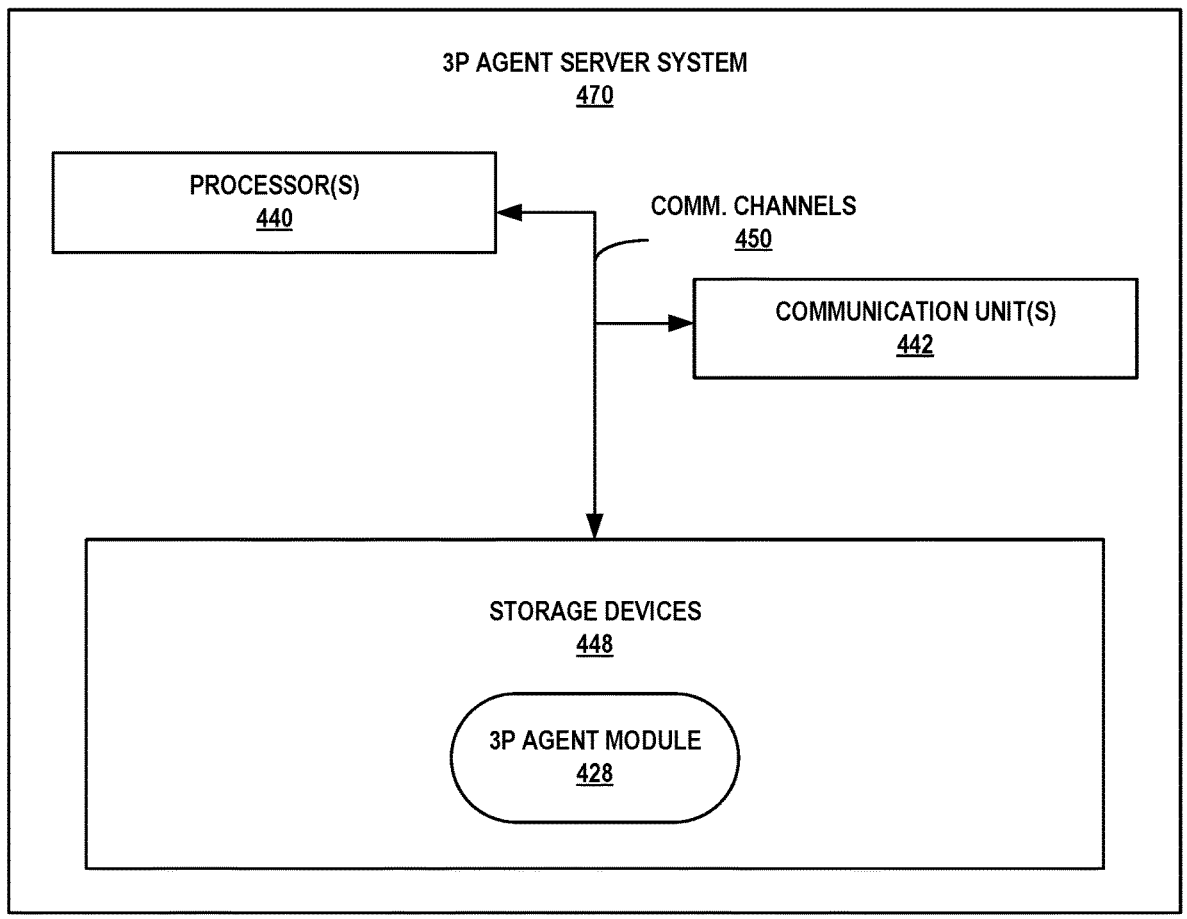
FIG. 4 is a block diagram illustrating an example computing system that is configured to execute an example third party agent, in accordance with one or more aspects of the present disclosure.

FIG. 4 is a block diagram illustrating an example computing system that is configured to execute an example third party agent, in accordance with one or more aspects of the present disclosure. 3P agent server system 470 of FIG. 4 is described below as an example of a 3P agent server system of 3P agent server systems 170 of FIG. 1. FIG. 4 illustrates only one particular example of 3P agent server system 470, and many other examples of 3P agent server system 470 may be used in other instances and may include a subset of the components included in example 3P agent server system 470 or may include additional components not shown in FIG. 4.

As shown in the example of FIG. 4, 3P agent server system 470 includes user one or more processors 440, one or more communication units 442, and one or more storage components 448. Storage components 348 include 3P agent module 428.

Processors 440 are analogous to processors 340 of assistant server system 360 of FIG. 3. Communication units 442 are analogous to communication units 342 of assistant server system 360 of FIG. 3. Storage devices 448 are analogous to storage devices 348 of assistant server system 360 of FIG. 3. Communication channels 450 are analogous to communication channels 350 of assistant server system 360 of FIG. 3 and may therefore interconnect each of the components 440, 442, and 448 for inter-component communications. In some examples, communication channels 450 may include a system bus, a network connection, an inter-process communication data structure, or any other method for communicating data.

3P agent module 428 may include all functionality of a local 3P agent module of local 3P agent modules 128 and a corresponding remote 3P agent module of remote 3P agent modules 128 of FIG. 1. 3P agent module 428 may perform similar operations as a remote 3P agent module of remote 3P agent modules 128 for providing a third party agent that is accessible via 3P agent server system 470. That is, 3P agent module 428 may act as an interface to a remote agent service accessible to a computing device that is communicating over a network with 3P agent server system 470. For example, 3P agent module 428 may be an interface or API to a remote 3P agent module of remote 3P agent modules 128 of a 3P agent server system of 3P agent server systems 170 of FIG. 1.

In operation, 3P agent module 428 may be invoked by a user's computational assistant. For instance, 3P agent module 428 may be invoked by the assistant provided by assistant modules 122 of FIG. 1 to perform one or more actions to satisfy a user utterance received at computing device 110. After performing at least some of the actions (e.g., performing one or more elements of a multi-element task), 3P agent module 428 may send an indication of the actions performed to the invoking assistant. For instance, if invoked to process an order, 3P agent module 428 may output one or more details of the order to the assistant.

Figure 5:
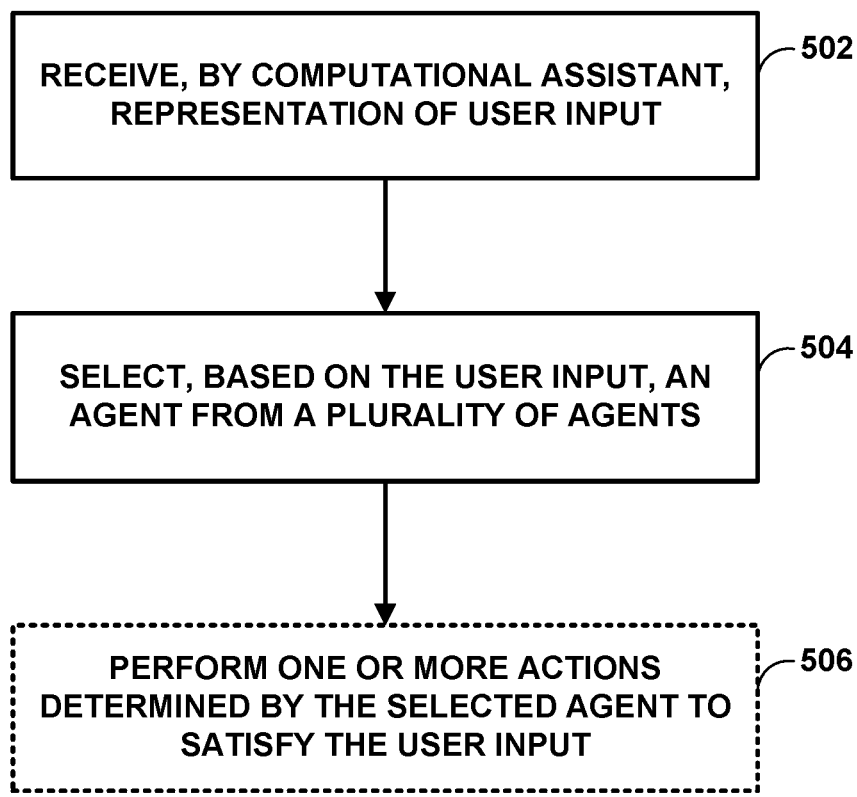
FIG. 5 is a flowchart illustrating example operations performed by one or more processors executing an example virtual assistant, in accordance with one or more aspects of the present disclosure.

FIG. 5 is a flowchart illustrating example operations performed by one or more processors executing an example virtual assistant, in accordance with one or more aspects of the present disclosure. FIG. 5 is described below in the context of system 100 of FIG. 1. For example, local assistant module 122A while executing at one or more processors of computing device 110 may perform operations 502-506, in accordance with one or more aspects of the present disclosure. And in some examples, remote assistant module 122B while executing at one or more processors of assistant server system 160 may perform operations 500-506, in accordance with one or more aspects of the present disclosure. For purposes of illustration only, FIG. 5 is described below within the context of computing device 110 of FIG. 1.

In operation, computing device 110 may receive an indication of user input that is indicative of a conversation between a user of a computing device and an assistant (502). For example, a user of computing device 110 may provide the utterance "I need a ride to the airport" at UID 112 that is received by local assistant module 122A as voice data.

Computing device 110 may select, based on the user input, an agent from a plurality of agents (504). For instance, local assistant module 122A may determine whether the utterance includes one or more triggers words associated with agents of the plurality of agents. If the computing device 110 is able to identify one or more agents that are associated with trigger words included in the utterance, computing device 110 may rank, based at least in part on a comparison between information related to the identified agents and text determined from the utterance, the identified agents. Computing device 110 may select, based at least in part on the ranking, an agent of the identified agents to satisfy the utterance.

In some examples, the plurality of agents may one or more first party agents and a plurality of third party agents. In some of such examples, computing device 110 may determine to select a third party agent (i.e., determine to bring in a third party agent) when the user input does not include any trigger words associated with first party agents.

The selected agent may determine one or more actions to respond to the user input. In some examples, computing device 110 may perform, at least in part, the one or more actions determined by the selected agent (506). For instance, where the utterance is to "play a song by Artist A", the selected agent may cause computing device 110 to play a song by Artist A. In some examples, the one or more actions determined by the selected agent may be performed at least in part by a computing device other than computing device 110. For instance, where the utterance is "I need a ride to the airport," the selected agent may output a request to a computing device of a transportation company, and the computing device of the transportation company may route a vehicle to transport the user of computing device 110 to the airport.

In some examples, an agent may refer to another agent in the course of interacting with a user. For example, a product search agent may refer to a payment agent to arrange payment from a user (e.g., such as when the product search agent cannot handle payment by itself). This may be done as a matter of convenience for the user (e.g., so the user can use a common payment interface and/or to enhance security), or may be done for a fee or other consideration paid by the party to whom the referral is made (e.g., the publisher of the payment agent may receive some consideration for processing the payment).

Figure 6A:
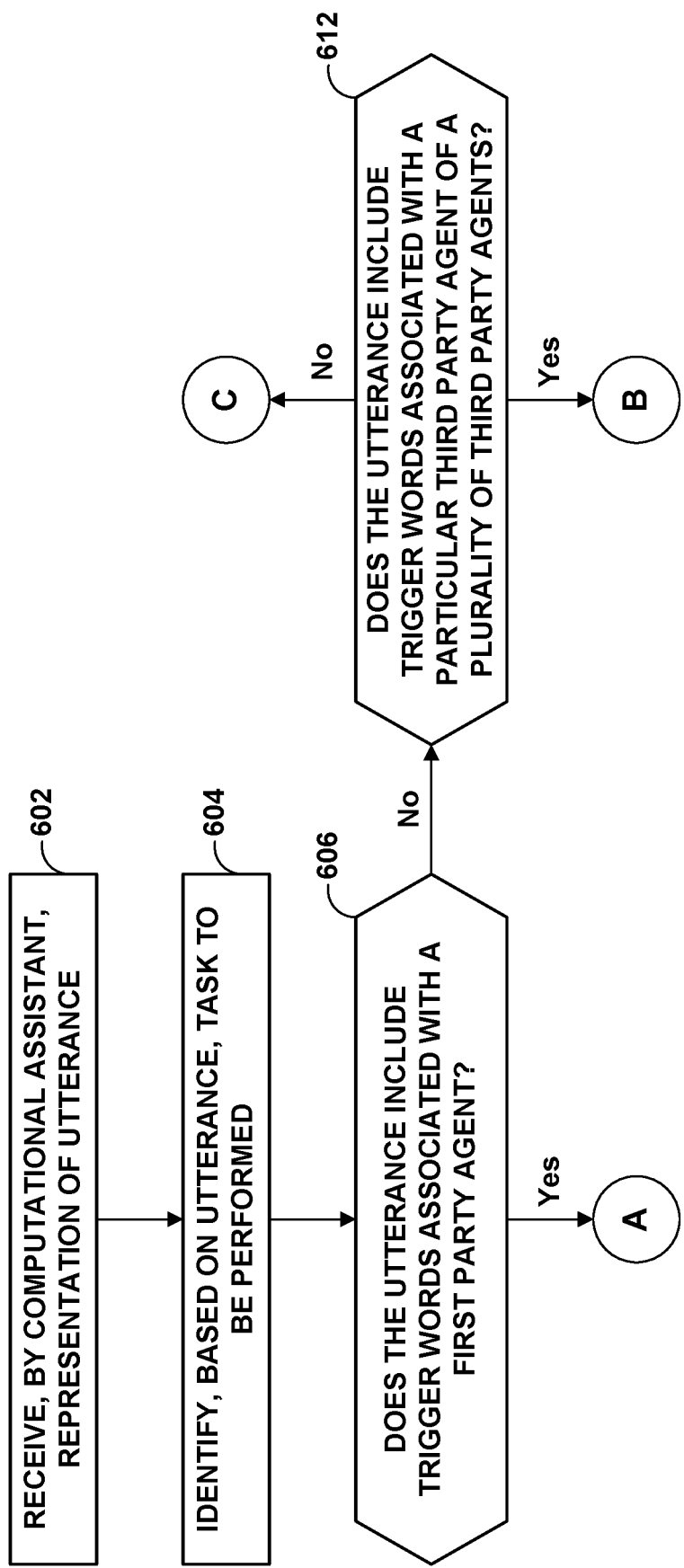
FIGS. 6A-6C are flowcharts illustrating example operations performed by one or more processors to select a virtual agent to perform a task, in accordance with one or more aspects of the present disclosure.
Figure 6B:
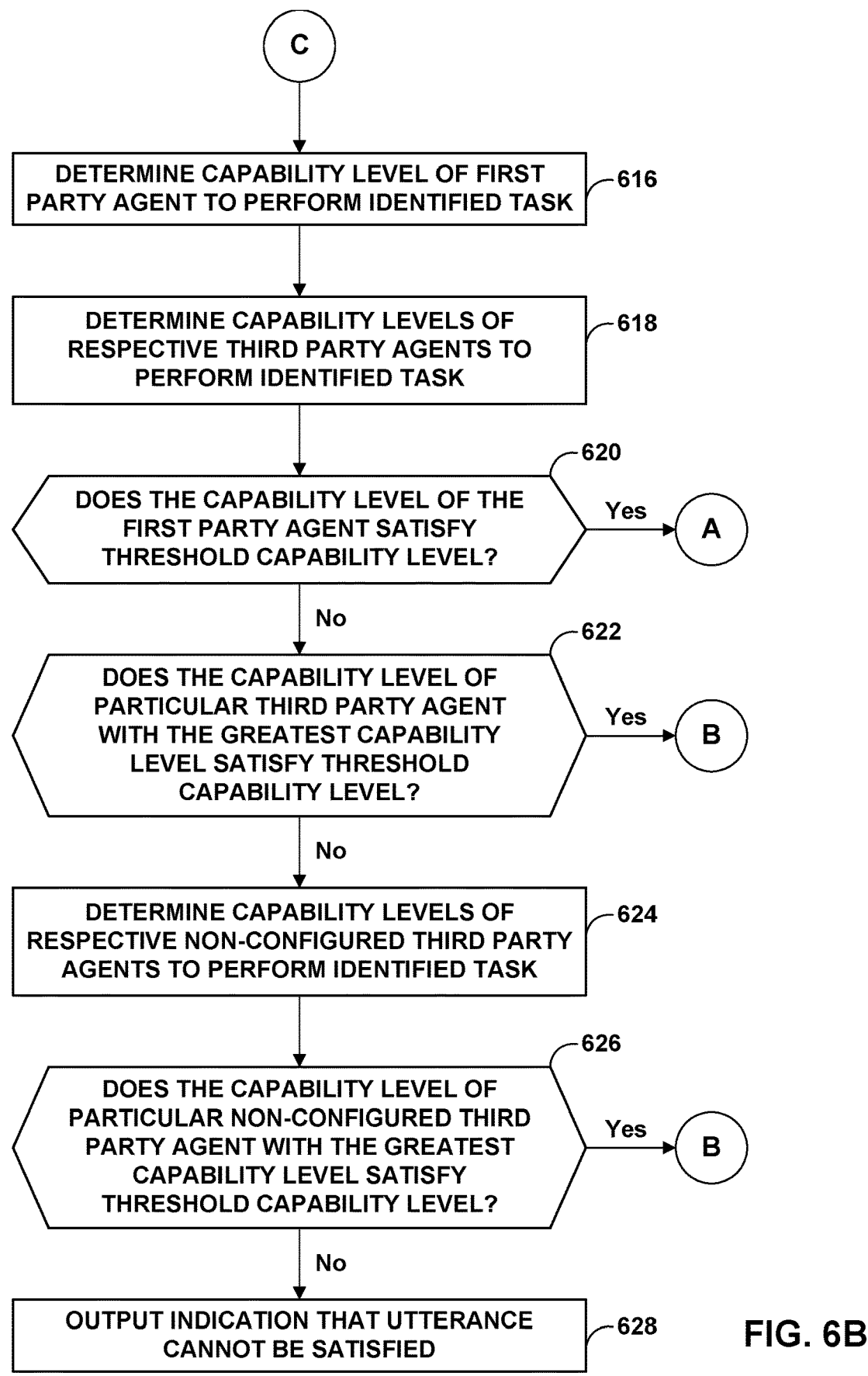
Figure 6C:
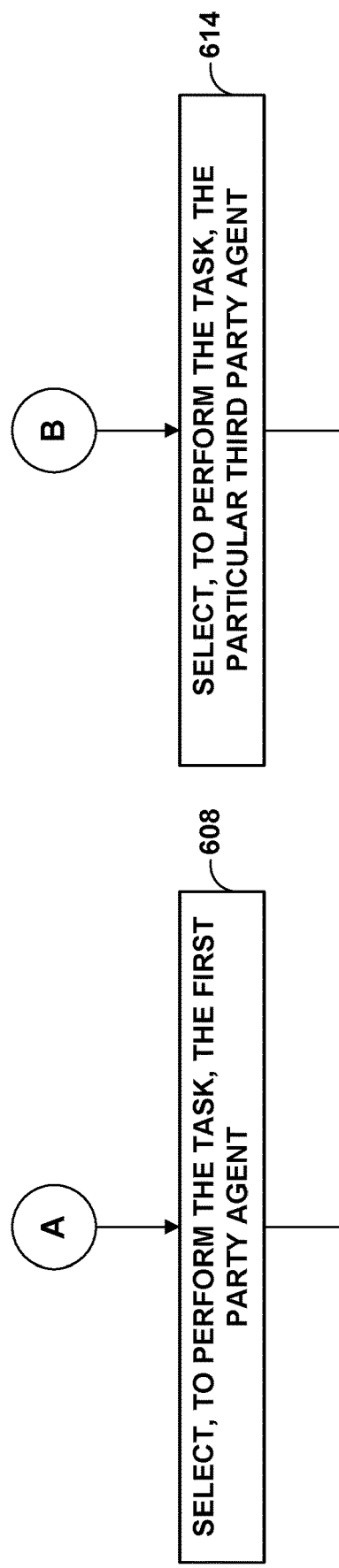

FIGS. 6A-6C are flowcharts illustrating example operations performed by one or more processors to select a virtual agent to perform a task, in accordance with one or more aspects of the present disclosure. FIGS. 6A-6C are described below in the context of system 100 of FIG. 1. For example, local assistant module 122A, while executing at one or more processors of computing device 110, may perform one or more of operations 602-628, in accordance with one or more aspects of the present disclosure. And in some examples, remote assistant module 122B, while executing at one or more processors of assistant server system 160, may perform one or more of operations 602-628, in accordance with one or more aspects of the present disclosure. For purposes of illustration only, FIGS. 6A-6C are described below within the context of computing device 110 of FIG. 1.

In operation, computing device 110 may receive a representation of an utterance spoken at computing device 110 (602). For example, one or more microphones of UID 112 of computing device 110 may generate audio data that represents a user of computing device 110 saying "turn on my basement lights." UID 112 may provide the audio data to the assistant provided by local assistant module 122A and/or remote assistant module 122B of assistant server system 160.

The assistant may identify, based on the utterance, a task to be performed (604). As one example, where the utterance is "turn on my basement lights," the assistant may parse the audio data to determine that the task is to activate lights in a room called basement. As another example, where the utterance is "order me a pizza from Pizza Joint delivered home," the assistant may parse the audio data to determine that the task is to place an order for a pizza for delivery to the user's home address from a place called Pizza Joint. As another example, where the utterance is "ask Search Company what is the average airspeed velocity of a raven," the assistant may parse the audio data to determine that the task is to perform a web search for the average airspeed velocity of a raven.

The assistant may determine whether the utterance includes any trigger words (e.g., words or phrases) associated with a first party agent of a plurality of agents (606). For instance, the assistant may compare words in the utterance with first party trigger phrases included in agent index 124A. If the utterance includes any trigger words associated with a first party agent ("Yes" branch of 606), the assistant may select the first party agent to perform the task (608), and cause the selected first party agent to perform the task (610). For example, where the utterance is "ask Search Company what is the average airspeed velocity of a raven" and agent index 124A indicates that "Search Company" is a trigger word associated with a first party search agent, the assistant may select and cause the first party search agent to perform a web search for the average airspeed velocity of a raven.

If the utterance does not include any trigger words associated with a first party agent ("No" branch of 606), the assistant may determine whether the utterance includes any trigger words associated with a third party agent of the plurality of agents (612). For instance, the assistant may compare words in the utterance with third party trigger phrases included in agent index 124A. If the utterance includes any a trigger word associated with a particular third party agent ("Yes" branch of 612, the assistant may select the particular third party agent to perform the task (608), and cause the particular third party agent to perform the task (610). For example, where the utterance is "order me a pizza from Pizza Joint delivered home" and agent index 124A indicates that "order" and "Pizza Joint" are trigger words associated with a particular third party ordering agent, the assistant may select and cause the particular third party ordering agent to create an order for a pizza to be delivered to the user's residence.

The assistant may rank the agents (e.g., based on their capabilities to perform the task). For instance, if the utterance does not include any trigger words associated with a third party agent ("No" branch of 612), the assistant may determine capability levels of a first party agent (616) and third party agents (618) to perform the identified task. As one example, to calculate the capability level of the first party agent, the assistant may calculate a metric that indicates how capable the assistant would be of performing the identified task. As another example, the assistant may calculate a respective metric for respective third party agents that indicates how capable the respective third party agent would be of performing the identified task. For instance, the assistant may calculate a metric for a first 3P agent that indicates how capable the first 3P agent would be of performing the identified task and a metric for a second 3P agent that indicates how capable the second 3P agent would be of performing the identified task. In some examples, the metric may have a positive correlation with capability such that higher values indicate more capable performance. In some examples, the metric may have a negative correlation with capability such that lower values indicate more capable performance. The metrics may be calculated in a variety of manners. As one example, the metrics may be calculated based on the agent quality scores (either modified based on the web search or not) or other information stored in agent index 124 as discussed above.

The assistant may select an agent based on the rankings. For instance, the assistant may determine whether the capability level of the first party agent satisfies a threshold capability level (620). For example, if the metrics are positively correlated with capability, the assistant may determine whether the capability level of the first party agent is greater than or equal to the threshold capability level. If the capability level of the first party agent satisfies the threshold capability level ("Yes" branch of 620), the assistant may select the first party agent to perform the task (608), and cause the selected first party agent to perform the task (610).

If the capability level of the first party agent does not satisfy the threshold capability level ("No" branch of 620), the assistant may determine whether the third party agent with the greatest capability level (hereinafter the "particular third party agent") satisfies the threshold capability level (622). If the capability level of the particular third party agent satisfies the threshold capability level ("Yes" branch of 622), the assistant may select the particular third party agent to perform the task (608), and cause the particular third party agent to perform the task (610).

As shown above, in some examples, the assistant may select an agent with a bias toward first party agents. For instance, by evaluating the first party agent before evaluating the third party agents, the assistant may select the first party agent to perform the task so long as the capability level of the first party agent satisfies the threshold capability level (even if a third party agent has a greater capability level than the first party agent). In other examples, the assistant may select an agent without a bias toward first party agents. For instance, if the agent with the greatest capability level satisfies the threshold capability level, the assistant may select the agent to perform the task regardless of whether the agent is first party or third party.

If the capability level of the particular third party agent does not satisfy the threshold capability level ("No" branch of 622), the assistant may determine capability levels of non-configured third party agents (624) and determine whether the non-configured third party agent with the greatest capability level (hereinafter the "particular non-configured third party agent") satisfies the threshold capability level (626). If the capability level of the particular non-configured third party agent satisfies the threshold capability level ("Yes" branch of 626), the assistant may offer to configure the particular non-configured third party agent. For instance, the assistant may output synthesized voice data to ask the user if they would like to configure the particular non-configured third party agent. If the user indicates that they would like to configure the particular non-configured third party agent (turning the particular non-configured third party agent into the particular third party agent), the assistant may select the particular third party agent to perform the task (608), and cause the particular third party agent to perform the task (610).

As discussed above, some 3P agents may require configuration (e.g., being enabled or activates) prior to being used by the assistant. In general, it may be desirable to for the assistant to select a pre-configured agent to perform the task. However, it may be desirable for the assistant to evaluate non-configured agents to perform the task if no other agents are capable. For instance, if the first party agent and any configured third party agents are not capable of performing the identified task, the assistant may evaluate non-configured agents to perform the identified task.

If the capability level of the particular non-configured third party agent does not satisfy the threshold capability level ("No" branch of 626), the assistant may output an indication that the utterance cannot be satisfied (628). For instance, the assistant may output synthesized voice data to say that they assistant "is not sure how to help with that."

Figure 7:
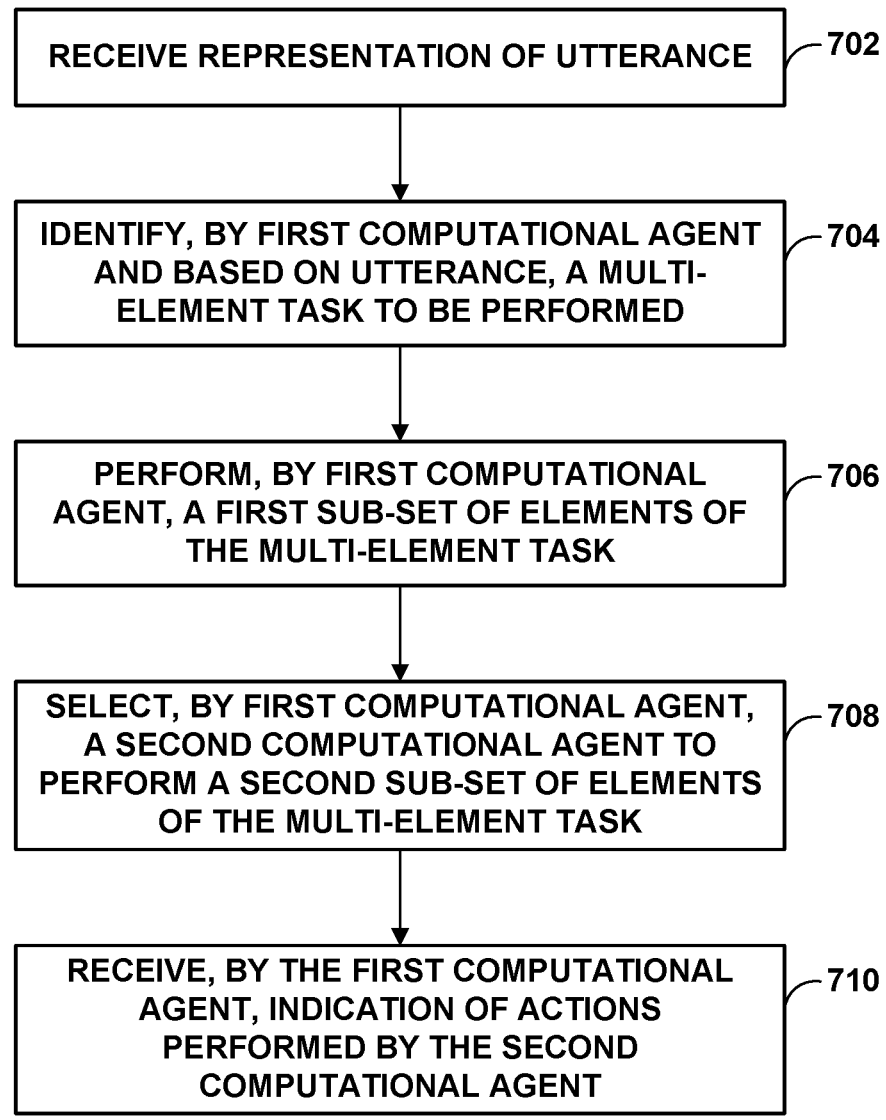
FIG. 7 is a flowchart illustrating example operations performed by one or more processors to facilitate task performance by multiple virtual agents, in accordance with one or more aspects of the present disclosure.

FIG. 7 is a flowchart illustrating example operations performed by one or more processors to facilitate task performance by multiple virtual agents, in accordance with one or more aspects of the present disclosure. FIG. 7 is described below in the context of system 100 of FIG. 1. For example, local assistant module 122A while executing at one or more processors of computing device 110 may perform one or more of operations 702-710, in accordance with one or more aspects of the present disclosure. And in some examples, remote assistant module 122B while executing at one or more processors of assistant server system 160 may perform one or more of operations 702-710, in accordance with one or more aspects of the present disclosure. For purposes of illustration only, FIG. 7 is described below within the context of computing device 110 of FIG. 1.

Some tasks that may be performed by the assistant and/or agents may be considered multi-element tasks. A multi-element task may be a task having elements that may be performed by different agents in order to accomplish the overall task. While the elements of a multi-element task may be performed by multiple agents (e.g., a first agent may perform a first element of a two element task and a second agent may perform the second element), a single agent may still be able to perform all of the elements. In some examples, the selection of another agent to perform a sub-set of elements of a multi-element task may be considered to be an element of the multi-element task.

In operation, computing device 110 may receive a representation of an utterance spoken at computing device 110 (702). For example, one or more microphones of UID 112 of computing device 110 may generate audio data that represents a user of computing device 110 saying "get me a large cheese pizza delivered home." UID 112 may provide the audio data to the assistant provided by local assistant module 122A and/or remote assistant module 122B of assistant server system 160.

A first computational agent from a plurality of computational agents may identify, based on the utterance, a multi-element task to be performed (704). For instance, where the utterance is "get me a large cheese pizza for delivery," the first computational agent (e.g., the assistant or an agent provided by one of local 3P agent modules 128A of FIG. 1) may identify the multi-element task as having the following elements 1) determine location of delivery, 2) select agent to order the pizza, and 3) process the order for the large cheese pizza.

The first computational agent may perform a first sub-set of the elements of the multi-element task (706) including selecting a second computational agent to perform a second sub-set of the multi-element task (708). For instance, the first computational agent may determine the location of delivery and select an agent to order the pizza. To determine the location of delivery, the first computational agent may ask the user where they would like the pizza delivered. For instance, the first computational agent may cause computing device 110 to output synthesized audio data asking "where would you like that delivered to." The first computational agent may receive the user's reply via one or more microphones of computing device 110. The first computational agent may select a second computational agent to order the pizza to the provided address. For instance, the first computational agent may utilize the techniques of FIGS. 6A-6C to select a second computational agent to order the pizza. In this example, assuming the utterance does not include any trigger words for agents, the first computational agent may select a second computational agent to order the pizza based on capability levels of agents to arrange for delivery of a pizza to the address. The first computational agent may communicate with the selected second computational agent to cause the second computational agent to process the order for the large cheese pizza.

The first computational agent may receive an indication of actions performed by the second computational agent (710). For instance, the first computational agent may receive, from the second computational agent, a confirmation that the large cheese pizza has been ordered and is expected to be delivered to the provided address by a specified time. Where the first computational agent is a first party agent, the first computational agent may utilize the indication of the actions performed by the second computational agent to monitor the performance of the second computational agent (e.g., to modify an agent quality score of the second computational agent). Determining that a task is a multi-task and splitting each element of the task between different agents allows the most appropriate agent to perform any given step of the task. It may additionally allow the tasks of the multi-task to be carried in parallel. Additionally, user interaction with the computing device 110 is improved. For example, the user may be guided through the process of ordering a pizza, as described above.

Figure 8:
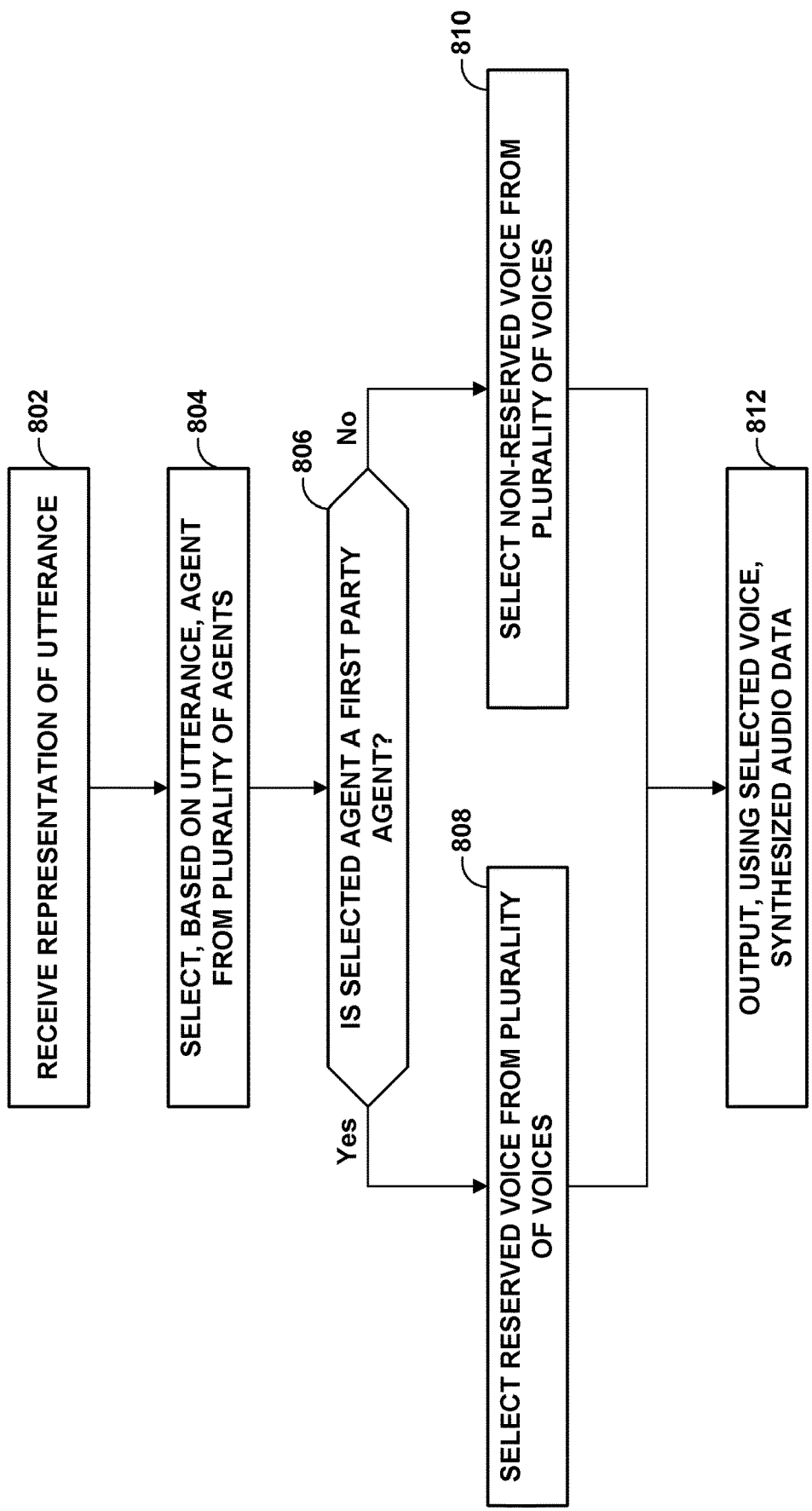
FIG. 8 is a flowchart illustrating example operations performed by one or more processors to select a voice for use when outputting synthesized audio data of text generated by virtual agents, in accordance with one or more aspects of the present disclosure.

FIG. 8 is a flowchart illustrating example operations performed by one or more processors to select a voice for use when outputting synthesized audio data of text generated by virtual agents, in accordance with one or more aspects of the present disclosure. FIG. 8 is described below in the context of system 100 of FIG. 1. For example, local assistant module 122A while executing at one or more processors of computing device 110 may perform one or more of operations 802-812, in accordance with one or more aspects of the present disclosure. And in some examples, remote assistant module 122B while executing at one or more processors of assistant server system 160 may perform one or more of operations 802-812, in accordance with one or more aspects of the present disclosure. For purposes of illustration only, FIG. 8 is described below within the context of computing device 110 of FIG. 1.

In operation, computing device 110 may receive a representation of an utterance spoken at computing device 110 (802). For example, one or more microphones of UID 112 of computing device 110 may generate audio data that represents a user of computing device 110 saying "ask Food Agent what I can substitute for baking powder." UID 112 may provide the audio data to the assistant provided by local assistant module 122A and/or remote assistant module 122B of assistant server system 160.

The assistant may select, based on the utterance, an agent from a plurality of agents (804). For instance, the assistant may utilize the techniques of FIGS. 6A-6C to select an agent to satisfy the utterance. In the example where the utterance is "ask Food Agent what I can substitute for baking powder" and "Food Agent" is a third party agent, the assistant may select the Food Agent to satisfy the utterance.

The selected agent may respond to the utterance by causing computing device 110 to output synthesized audio data. For instance, the selected agent may provide text on-which computing device 110 may perform text-to-speech (TTS) to generate synthesized audio data. However, as opposed to having synthesized audio data generated for all agents using the same voice, it may be desirable for different agents to use different voices. Additionally, it may be desirable for a user to be able to discern whether they are interacting with a first party agent or a third party agent.

In accordance with one or more techniques of this disclosure, first party agents may output synthesized audio data using a reserved voice of a plurality of voices whereas third party agents may output synthesized audio data using voices of the plurality of voices other than the reserved voice. As such, the techniques of this disclosure enable a first 3P agent may output synthesized audio data using a different voice than a second 3P agent while still providing users an indication of when they are interacting with a 1P agent (i.e., synthesized audio data using the reserved voice). Therefore, further information may be encoded in the audio data when output to the user. The further information may relate to the agent with which the user is interacting which may be encoded by way of the voice used for the output. An example of these voice selection techniques is illustrated in FIG. 8 and described below.

The assistant may determine whether the selected agent is a first party agent (806). In the example where the utterance is "ask Food Agent what I can substitute for baking powder" and the Food Agent is selected to satisfy the utterance, the assistant may determine that the selected agent is not a first party agent.

If the selected agent is a first party agent ("Yes" branch of 806), the selected agent (e.g., the assistant or another 1P agent) may select a reserved voice from a plurality of voices (808) and output, using the selected voice, synthesized audio data (812). For instance, where the utterance is "set my downstairs thermostat to 71" and the selected agent is a 1P agent, the 1P agent may cause computing device 110 to output, using the reserved voice, synthesized audio data saying "setting your downstairs thermostat to seventy-one degrees."

If the selected agent is not a first party agent ("No" branch of 806), the selected agent may a non-reserved voice from the plurality of voices (810) and output, using the selected voice, synthesized audio data (812). For instance, where the utterance is "ask Food Agent what I can substitute for baking powder" and the selected agent is the Food Agent 3P agent, the Food Agent may cause computing device 110 to output, using a voice from the plurality of voices other than the reserved voice, synthesized audio data saying "you can substitute one-quarter teaspoon baking soda plus five-eighths teaspoon cream of tartar for one teaspoon."

In some examples, the utterance may be satisfied by outputting synthesized audio data to read a list. For instance, where a task identified based on the utterance is a search, satisfaction of the utterance may include outputting synthesized audio data to read a list of search results. In some examples, a single agent may read all of the elements of a list using a single voice. For instance, the first party agent may read a full list of search results using the reserved voice. In some examples, a single agent may use different voices when reading different sub-sets of elements of a list. For instance, the first party agent may use a non-reserved voice when outputting synthesized audio data that represents a first sub-set of search results and use the reserved voice when outputting synthesized audio data that represents a second sub-set of search results. In some examples, multiple agents may read different portions of a list using different voices. For instance, a first agent may use a first voice when outputting synthesized audio data that represents a first sub-set of search results and a second agent use a second voice when outputting synthesized audio data that represents a second sub-set of search results. An adaptive interface is therefore provided, where the output of the data is adapted based upon the data itself.

As discussed above, the assistant may cause an agent to perform a task (or at least some elements of a task). In some examples, the assistant may cause a selected agent to perform a task by invoking the selected agent. For instance, the assistant may send the selected agent (e.g., at an entry point of the selected agent, which may be identified from an agent index) a request to perform the task. In some examples, when a selected agent is caused to perform a task, the selected agent may perform the task locally. For instance, when a 3P agent provided by a local 3P agent module of local 3P agent modules 228 of FIG. 2 is invoked to perform a task, the local 3P agent module of local 3P agent modules 228 may execute at processors 240 to perform the task. In some examples, when a selected agent is caused to perform a task, the selected agent may perform the task locally. For instance, when a 3P agent provided by 3P agent module 428 of FIG. 4 is invoked to perform a task, 3P agent module 428 may execute at processors 440 to perform the task. In some examples, when a selected agent is caused to perform a task, the selected agent may perform the task mixed between local and remote environments. For instance, a 3P agent provided by a local 3P agent module of local 3P agent modules 228 of FIG. 2 and/or a corresponding remote 3P agent module of remote 3P agent modules 128 is invoked to perform a task, the agent may execute at one or both of processors of computing device 110 and processors of a 3P agent server system that includes the corresponding remote 3P agent module of remote 3P agent modules 128.

The following numbered examples may illustrate one or more aspects of the disclosure:

Example 1

A method comprising: receiving, by a computational assistant executing at one or more processors, a representation of an utterance spoken at a computing device; identifying, based on the utterance, a task to be performed; determining a capability level of a first party agent to perform the task; determining capability levels of respective third party agents of a plurality of third party agents to perform the task; responsive to determining that the capability level of the first party agent does not satisfy a threshold capability level, that a capability level of a particular third party agent of the plurality of third party agents is a greatest of the determined capability levels, and that the capability level of the particular third party agent satisfies the threshold capability level, selecting the particular third party agent to perform the task; and causing the selected agent to perform the task.

Example 2

The method of example 1, wherein the plurality of third party agents comprise a plurality of pre-configured third party agents, the method further comprising: determining capability levels of respective third party agents of a plurality of non-configured third party agents to perform the task; and responsive to determining that the capability level of the particular third party agent of the plurality of pre-configured third party agents does not satisfy the threshold capability level, that a capability level of a particular third party agent of the plurality of non-configured third party agents is a greatest of the determined capability levels for the plurality of non-configured third party agents, and that the capability level of the particular third party agent of the plurality of non-configured third party agents satisfies the threshold capability level, selecting the particular third party agent of the plurality of non-configured third party agents to perform the task.

Example 3

The method of any combination of examples 1-2, further comprising: responsive to determining that the utterance includes one or more trigger words associated with the first party agent, selecting the first party agent to perform the task; and responsive to determining that the utterance includes one or more trigger words associated with a third party agent, selecting the third party agent to perform the task.

Example 4

The method of example 3, wherein selecting the third party agent responsive to determining that the utterance includes one or more trigger words associated with a third party agent further comprises: identifying one or more third party agents of the plurality of third party agents that are associated with trigger words included in the utterance; ranking, based at least in part on a comparison between information related to the identified third party agents and text determined from the utterance, the identified third party agents; and selecting, based at least in part on the ranking, an agent of the identified third party agents to satisfy the utterance.

Example 5

The method of example 4, wherein the ranking is further based on a pre-determined score for each of the identified third party agents.

Example 6

The method of any combination of examples 1-5, wherein the one or more processors are included in the computing device.

Example 7

The method of any combination of examples 1-5, wherein the one or more processors are included in a computing system.

Example 8

A computing device comprising at least one processor; and at least one memory comprising instructions that when executed, cause the at least one processor to execute an assistant configured to perform the method of any combination of examples 1-5.

Example 9

A computing system comprising at least one processor; and at least one memory comprising instructions that when executed, cause the at least one processor to execute an assistant configured to perform the method of any combination of examples 1-5.

Example 10

A computing system comprising means for performing the method of any combination of examples 1-5.

Example 11

A computer-readable storage medium storing instructions that, when executed, cause one or more processors to execute an assistant configured to perform the method of any combination of examples 1-5.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
   receiving, by a computational assistant executing at one or more processors, a representation of an utterance spoken at a computing device;
   identifying, based on the utterance, a task to be performed, wherein the task to be performed is a multi-element task;
   determining a capability level of a first party agent to perform the task;
   determining whether the capability level of the first party agent satisfies a threshold capability level;
   in response to determining that the capability level of the first party agent does not satisfy the threshold capability level:
      determining capability levels of respective third party agents of a plurality of third party agents to perform the task,
         wherein determining that the capability level of the first party agent does not satisfy the threshold capability level comprises determining that the capability level of the first party agent is associated with a metric that indicates the first party agent can perform a sub-set of elements of the multi-element task;
   determining whether a particular capability level of a particular third party agent, of the plurality of third party agents, satisfies the threshold capability level;
   in response to determining that the particular capability level of the particular third party agent satisfies the threshold capability level;
      selecting the particular third party agent, from among the plurality of third party agents, to perform the task,
         wherein determining that the particular capability level of the particular third party agent satisfies the threshold capability level comprises determining that the particular capability level of the particular third party agent is associated with a particular metric that indicates the particular third party agent can perform each element of the multi-element task; and
   causing the selected agent to perform the task.

2. The method of claim 1, wherein the plurality of third party agents comprise a plurality of pre-configured third party agents, the method further comprising:
   in response to determining that the particular capability level of the particular third party agent, of the plurality of pre-configured third party agents, does not satisfy the threshold capability level:
      determining additional capability levels of additional respective third party agents, of a plurality of non-configured third party agents to perform the task;
   determining whether an additional particular capability level of a particular non-configured third party agent, of the plurality of non-configured third party agents, satisfies the threshold capability level; and
   in response to determining that the additional particular capability level of the particular non-configured third party agent satisfies the threshold capability level;
      selecting the particular non-configured third party agent, from among the plurality of non-configured third party agents to perform the task.

3. The method of claim 1, wherein the one or more processors are included in the computing device.

4. The method of claim 1, wherein the one or more processors are included in a computing system.

5. A computing device comprising:
   at least one processor; and
   at least one memory comprising instructions that when executed, cause the at least one processor to execute an assistant configured to:
      receive a representation of an utterance spoken at one or more microphones operably connected to the computing device;
      identify, based on the utterance, a task to be performed, wherein the task to be performed is a multi-element task;
      determine a capability level of a first party agent to perform the task;
      determine whether the capability level of the first party agent satisfies a threshold capability level;
      in response to determining that the capability level of the first party agent does not satisfy the threshold capability level:
         determine capability levels of respective third party agents of a plurality of third party agents to perform the task,
            wherein, in determining that the capability level of the first party agent does not satisfy the threshold capability level, the assistant is configured to determine that the capability level of the first party agent is associated with a metric that indicates the first party agent can perform a sub-set of elements of the multi-element task;
      determine whether a particular capability level of a particular third party agent, of the plurality of third party agents, satisfies the threshold capability level;
      in response to determining that the particular capability level of the particular third party agent satisfies the threshold capability level:
         select the particular third party agent, from among the plurality of third party agents, to perform the task,
            wherein, in determining that the particular capability level of the particular third party agent satisfies the threshold capability level, the assistant is configured to determine that the particular capability level of the particular third party agent is associated with a particular metric that indicates the particular third party agent can perform each element of the multi-element task; and
      cause the selected agent to perform the task.

6. The device of claim 5, wherein the plurality of third party agents comprise a plurality of pre-configured third party agents, the assistant further configured to:

in response to determining that the particular capability level of the particular third party agent, of the plurality of pre-configured third party agents, does not satisfy the threshold capability level:
  determine additional capability levels of additional respective third party agents of a plurality of non-configured third party agents to perform the task;
  determine whether an additional particular capability level of a particular non-configured third party agent, of the plurality of non-configured third party agents, satisfies the threshold capability level; and
  in response to determining that the additional particular capability level of the particular non-configured third party agent satisfies the threshold capability level:
    select the particular non-configured third party agent, from among of the plurality of non-configured third party agents to perform the task.

7. The device of claim 5, wherein the assistant is further configured to: select a first party agent of the one or more first party agents responsive to determining that satisfaction of the utterance needs special assistance.

8. A computing system comprising:
one or more communication units;
at least one processor; and
at least one memory comprising instructions that when executed, cause the at least one processor to execute an assistant configured to:
  receive, from a computing device and via the one or more communication units, a representation of an utterance spoken at the computing device;
  identify, based on the utterance, a task to be performed, wherein the task to be performed is a multi-element task;
  determine a capability level of a first party agent to perform the task;
  determine whether the capability level of the first party agent satisfies a threshold capability level;
  in response to determining that the capability level of the first party agent does not satisfy the threshold capability level:
    determine capability levels of respective third party agents of a plurality of third party agents to perform the task,
      wherein, in determining that the capability level of the first party agent does not satisfy the threshold capability level, the assistant is configured to determine that the capability level of the first party agent is associated with a metric that indicates the first party agent can perform a sub-set of elements of the multi-element task;
    determine whether a particular capability level of a particular third party agent, of the plurality of third party agents, satisfies the threshold capability level;
    in response to determining that the particular capability level of the particular third party agent satisfies the threshold capability level:
      select the particular third party agent, from among the plurality of third party agents, to perform the task,
        wherein, in determining that the particular capability level of the particular third party agent satisfies the threshold capability level, the assistant is configured to determine that the particular capability level of the particular third party agent is associated with a particular metric that indicates the particular third party agent can perform each element of the multi-element task; and
  cause the selected agent to perform the task.

9. The system of claim 8, wherein the plurality of third party agents comprise a plurality of pre-configured third party agents, the assistant further configured to:
  in response to determining that the particular capability level of the particular third party agent, of the plurality of pre-configured third party agents, does not satisfy the threshold capability level:
    determine additional capability levels of additional respective third party agents of a plurality of non-configured third party agents to perform the task;
    determine whether an additional particular capability level of a particular non-configured third party agent, of the plurality of non-configured third party agents, satisfies the threshold capability level; and
    in response to determining that the additional particular capability level of the particular non-configured third party agent satisfies the threshold capability level:
      select the particular non-configured third party agent, from among of the plurality of non-configured third party agents to perform the task.

10. The system of claim 8, wherein the assistant is further configured to: select a first party agent of the one or more first party agents responsive to determining that satisfaction of the utterance needs special assistance.

11. A non-transitory computer-readable storage medium storing instructions that, when executed, cause one or more processors to execute an assistant configured to:
  identify, based on the utterance, a task to be performed, wherein the task to be performed is a multi-element task;
  determine a capability level of a first party agent to perform the task;
  determine whether the capability level of the first party agent satisfies a threshold capability level;
  in response to determining that the capability level of the first party agent does not satisfy the threshold capability level:
    determine capability levels of respective third party agents of a plurality of third party agents to perform the task,
      wherein, in determining that the capability level of the first party agent does not satisfy the threshold capability level, the assistant is configured to determine that the capability level of the first party agent is associated with a metric that indicates the first party agent can perform a sub-set of elements of the multi-element task;
    determine whether a particular capability level of a particular third party agent, of the plurality of third party agents, satisfies the threshold capability level;
    in response to determining that the particular capability level of the particular third party agent satisfies the threshold capability level:
      select the particular third party agent, from among the plurality of third party agents, to perform the task,
        wherein, in determining that the particular capability level of the particular third party agent satisfies the threshold capability level, the assistant is configured to determine that the particular capability level of the particular third party agent is associated with a particular metric that indicates the particular third party agent can perform each element of the multi-element task; and
  cause the selected agent to perform the task.

* * * * *